DIFUNCTION COMPUTING ELEMENTS

Filed May 24, 1955 6 Sheets-Sheet 1

INVENTOR.
FLOYD G. STEELE
BY
Seymour M. Rosenberg
ATTORNEY

INVENTOR.
FLOYD G. STEELE
BY
Seymour M. Rosenberg
ATTORNEY

INVENTOR.
FLOYD G. STEELE
BY
Seymour M. Rosenberg
ATTORNEY

DIFUNCTION COMPUTING ELEMENTS

Filed May 24, 1955 6 Sheets-Sheet 4

INVENTOR.
FLOYD G. STEELE
BY
Seymour M. Greenberg
ATTORNEY

DIFUNCTION COMPUTING ELEMENTS

Filed May 24, 1955

INVENTOR.
FLOYD G. STEELE
BY
Seymour M. Rosenberg
ATTORNEY

INVENTOR.
FLOYD G. STEELE
BY
Seymour M. Rosenberg
ATTORNEY

United States Patent Office 3,022,949

Patented Feb. 27, 1962

3,022,949

DIFUNCTION COMPUTING ELEMENTS

Floyd G. Steele, La Jolla, Calif., assignor to Digital Control Systems, Inc., La Jolla, Calif.

Filed May 24, 1955, Ser. No. 510,673
23 Claims. (Cl. 235—152)

This invention relates to difunction computing elements and more particularly to difunction multiplier-dividers which are operative to combine two or more input difunction signal trains to produce an output difunction signal train consonant with the input trains and representative of either the product of the quantities represented by two of the trains, the quotient of the quantities represented by two of the trains, or the product of the quantities represented by two of the trains divided by the quantity represented by a third train.

Relatively recent developments in the field of digital computation have brought forth a new class of electronic digital computing elements in which operations are performed on and in response to what has come to be termed difunction signal trains, as contrasted with the conventional digital computing machines which operate upon signals representing weighted binary digits. As will be disclosed in more detail hereinafter, the term difunction signal train refers to a train of signals each having either a first value representing a first algebraic number or a second value representing a second algebraic number, and is readily distinguished from signal trains conventional in prior art computer systems in that all of the signals in the difunction signal train having the same value represent identical numbers.

For example, if it is assumed that the algebraic numbers in a difunction signal train are plus one and minus one, then each of the signals in the train individually represents either a plus one or a minus one, depending on the value of the signal. Stated differently, in a difunction signal train the individual signals are unweighted, each signal having equal significance with every other signal. Accordingly, a difunction signal train may be termed a non-numerical representation of the quantity which the train represents, since the signals are not weighted according to any number system, or in other words, have no radix as this term is customarily employed.

The representation of physical or mathematical quantities by difunction signal trains has been found to be extremely useful both in the solution of mathematical equations and in the field of automatic control. Some examples of the application of difunction representation to the solution of mathematical equations may be found in co-pending U.S. patent application Serial No. 388,780, filed by the same inventor on October 28, 1953, for Electronic Digital Differential Analyzer, wherein difunction signal trains are employed for communicating between the integrators of a digital differential analyzer. Similarly, co-pending U.S. Patent No. 2,898,040, issued August 4, 1959 by the same inventor, for Computer and Indicator System, discloses the application of difunction representation to the field of process control and also discloses electronic computing circuits which operate directly to perform mathematical operations by combining difunction signals.

Although it has been found that difunction signal trains may be added together, subtracted from each other, or integrated, there has existed a need for difunction computing elements which are capable of performing the additional mathematical operations of multiplication and division. In the past, all efforts to provide these additional difunction computing elements have in effect been failures, for although electronic circuits have been suggested which would in fact multiply difunction signals, these circuits are inherently limited in a number of particulars which greatly reduce their utility.

For example it has been found that two difunction signal trains may be multiplied together by abstracting a predetermined number of difunction signals from one train and individually multiplying each of the abstracted signals by each of a corresponding number of difunction signals abstracted from the other difunction signal train. Each of the individual products is then presented as an individual signal in the output difunction signal train; consequently, if the period of each difunction signal in the output train is the same as the period of each difunction signal in the input trains, and each of the two input trains is abstracted over P periods each having a time duration T, then the time required to produce the output signal is $(PT)^2$.

The disadvantages of this scheme of multiplication are obvious. Firstly, the output difunction signal train is virtually valueless for further computation, since it is not consonant with other difunction signal trains applied to the multiplier. Secondly, if it is assumed that only one output difunction signal train can be produced at a time, the input trains are abstracted or sampled very infrequently; in fact it may be shown tha over a large period of time only one out of every N signals in each input difunction signal train is sampled. Consequently the output difunction train may be grossly in error since it fails to take into consideration variations in the input trains which occur between abstractions of the input signals. Thirdly, a relatively large amount of apparatus is required to perform the multiplication.

The present invention, on the other hand, provides a difunction computing element which may be operated either as a difunction multiplier, a difunction divider, or both simultaneously, and which is continuously operative to produce an output signal which is consonant with the difunction input trains. More specifically, the present invention provides difunction multiplier-dividers which are capable of operating upon two or more difunction input trains and which make use of each and every difunction signal in the input trains to produce a resultant output difunction signal which not only accurately represents the result of the operation performed, but which is also consonant with the input trains. As will be disclosed in more detail hereinbelow, the term consonant signifies that one output difunction signal is produced for each set of input difunction signals received over a corresponding set of input conductors, the number of signals included in the output difunction signal over a given interval being equal to the number of signals appearing in each of the input difunction signal trains during the same interval. For example, assuming an embodiment of the invention has two input conductors for receiving two respectively associated input difunction signal trains and an output conductor for producing an output difunction signal train, the signals are consonant when the individual difunction signals in both input and output trains have the same period, one output difunction signal being produced in response to the application of a difunction input signal to each of the input conductors.

In accordance with the invention, the difunction multiplier-dividers herein disclosed are capable of combining a first input difunction signal train with one or more second input difunction signal trains to produce an output difunction signal train consonant with the input trains and non-numerically representative of one or both of the mathematical operations of multiplication and division upon the numerical equivalents of the quantities non-numerically represented by the input difunction signal trains. More particularly, the computing elements of the invention are capable of continuously and simultaneously combining two or more input difunction trains and are operative to produce an output difunction signal train which is non-numerically representative of either the product of the quantities represented by two of the input trains, the quotient of the quantities represented by two of the input trains, or the product of the quantities represented by two of the input trains divided by the quantity represented by a third input signal train.

According to the basic concept of the invention, the multiplier-dividers herein disclosed include a signal generating network which is responsive to the input difunction signal trains for generating electrical signals numerically representative of the product and/or the quotient of the numerical equivalents of the quantities non-numerically represented by the input difunction signal trains, and a converter which is operative to transform the electrical signals generated into a difunction signal train which is non-numerically representative of the result of the mathematical operation performed. More specifically, the difunction multiplier-dividers of the invention include an input storage element for storing a composite electrical signal representative of a binary number, a pair of accumulators selectively operable to periodically combine the composite signal stored in the storage element with composite signals stored in the accumulators, at least one of the accumulators being operable under the control of an input difunction train, and a difunction subtractor which is operative to apply to the input storage element a difference difunction signal train representative of the difference between another input difunction train and an overflow difunction train generated by one of the accumulators as a result of its signal combining operation.

In accordance with the invention the difunction multiplier-dividers herein disclosed may be operated either serially or as parallel devices, and may utilize any of the known forms of memory units such as bistable storage elements or a magnetic drum memory. In addition, the difunction multiplier-dividers of the invention may employ decision elements of various types for altering or modifying the transient and static response of the multiplier-dividers to fit any application.

It is, therefore, an object of the invention to provide continuously operable difunction multipliers.

Another object of the invention is to provide continuously operable difunction dividers.

A further object of the invention is to provide difunction multiplier-dividers which are operative to simultaneously multiply two difunction signal trains and to divide the product by a third difunction signal train to provide a resultant difunction output signal train consonant with the input difunction signal trains.

It is also an object of the invention to provide difunction multiplier-dividers which are capable of combining a first input difunction signal train with one or more second input difunction signal trains to produce an output difunction signal train consonant with the input trains and non-numerically representative of one or both of the mathematical operations of multiplication and division upon the numerical equivalents of the quantities non-numerically represented by the input difunction signal trains.

Still another object of the invention is to provide difunction computing elements which are capable of continuously and simultaneously combining two or more input difunction trains and are operative to produce an output difunction signal train which is non-numerically representative of either the product of the quantities represented by two of the input trains, the quotient of the quantities represented by two of the input trains, or the product of the quantities represented by two of the input trains divided by the quantity represented by a third input signal train.

A still further object of the invention is to provide difunction multiplier-dividers which are operative in response to two or more applied input difunction signal trains to first generate an electrical signal representative of the product and/or the quotient of the numerical equivalents of the quantities non-numerically represented by the input difunction signal trains, and then to convert the electrical signals generated into a difunction output signal train which is non-numerically representative of the result of the mathematical operation performed.

The novel features which are believed to be characteristic of the invention, both as to its organization and method of operation, together with further objects and advantages thereof, will be better understood from the following description considered in connection with the accompanying drawings in which several embodiments of the invention are illustrated by way of example. It is to be expressly understood, however, that the drawings are for the purpose of illustration and description only, and are not intended as a definition of the limits of the invention.

Before proceeding with the detailed description of the various embodiments of the invention, it is considered appropriate first to define more fully the terminology employed in difunction representation and then to illustrate the mathematical and physical significance of difunction signals as they are utilized to convey intelligence information.

As used in this specification, the term difunction signal train refers to a train of signals each having either a first value representing a first algebraic number $N_1$ or a second value representing a second algebraic number $N_2$. A difunction signal train may be readily distinguished from signal trains conventional in prior art computer systems in that all of the signals in the difunction signal train having the same value represent identical numbers, while in conventional signal trains signals having the same value represent different numbers depending upon the number system employed and the relative position or weighting of the signal in the train. For example in a binary number system signal train progressing from least significant digit first, successive signals represent the numbers 1 or 0, 2 or 0, 4 or 0, . . . $2^n$ or 0. On the other hand, in a difunction signal train in which the algebraic numbers are 1 and $-1$, all of the signals represent either 1 or $-1$, depending on the value of the signal. Stated differently, a difunction signal train differs from conventional numerical signal trains in that the signals of the difunction train are unweighted, each signal having equal significance with every other signal. Therefore, a difunction signal train may be termed a non-numerical representation, since the signals are not weighted according to any number system.

Difunction signal trains may take numerous forms the most common of which are, according to this invention, a bilevel electrical signal train, a train of bipolar electrical pulses, and a train of unipolar pulses in which the presence or absence of a pulse in an interval indicates the value of the signal. In addition, the algebraic numbers represented by the signals of a difunction signal train may both have the same sign, may have different signs, or may include one number which is zero. For purposes of clarity and simplicity, the following discussion of difunction signal trains (and of the specific embodiments of this invention) will be limited to a normalized system for a bilevel electrical signal train in which each signal has a predetermined time duration or period T and either a relatively high level representing the algebraic number +1 or a relatively low level representing the algebraic number −1.

Figure 1:
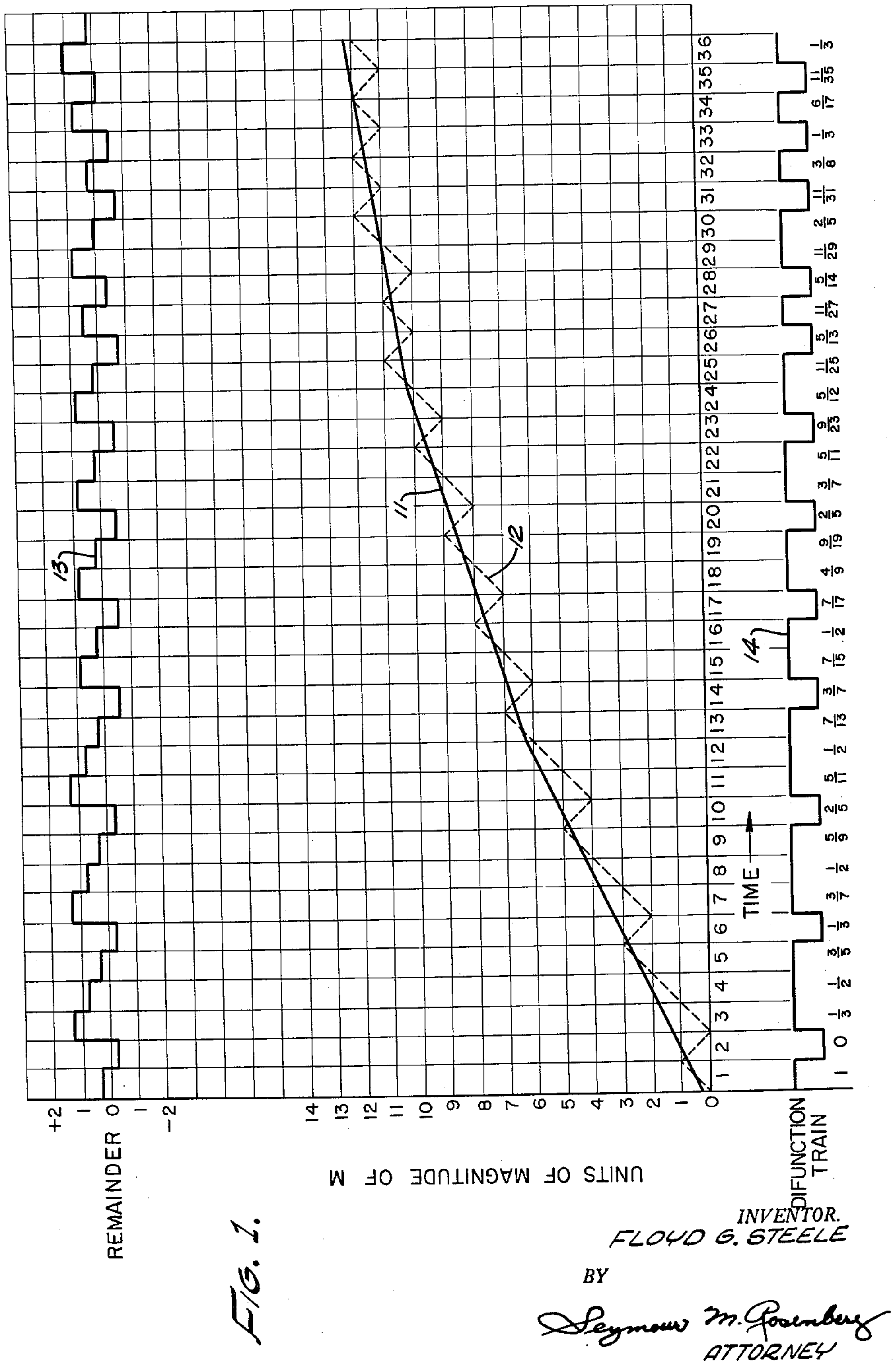
FIG. 1 is a composite diagram including a curve representing a function of time and a curve illustrating the difunction representation thereof.

In order to present more fully the theory and application of difunction signal trains, reference is now made to FIG. 1 which is a composite graphical representation of the variations of a variable quantity to be measured and the equivalent difunction signals. More particularly, there is shown in FIG. 1 a curve generally designated 11 representing the variations in units of magnitude with respect to time of a variable quantity M to be measured. It can readily be seen that curve 11 has slopes of ½, ⅓ and ⅙ for the first, second and third sets, respectively, of twelve units of time T. In addition, it can readily be observed that the average slope of curve 11 over the entire thirty-six units of time T shown in the drawing is equal to ⅓. It will now be demonstrated how the variations in quantity M may be represented by a difunction signal train and the significance of the train with respect to the properties of these variations.

As stated above, it will be assumed that the difunction signal train is established in a normalized system in which each difunction signal represents either the algebraic number +1 or the algebraic number −1. In other words, with respect to curve 11, each difunction signal can represent either a positive increment of one unit of magnitude per unit of time or a negative increment of one unit of magnitude per unit of time. Obviously, since curve 11 does not vary in this form of unital variation, a single difunction signal can only approximate the variations in the quantity M. However, if it is assumed for the moment, that the absolute magnitude of the maximum variation in quantity M is equal to one unit of magnitude per unit of time T, the single difunction signal will approximate the variation in quantity M per each unit of time to an extremely close degree. In fact, under the assumed conditions, the difunction signal will represent the most significant digit of the actual variation. Accordingly, if the system for generating the difunction signal train took into account the remainder, or in other words the difference between the actual variation experienced by quantity M and the unit variation represented by the difunction signal, and generated the succeeding difunction signal in a manner to reduce the remainder towards zero, this accuracy of the difunction signal train in representing the variations in quantity M would at least be maintained.

The concepts set forth in the preceding paragraph can be restated in terms of simple mathematics. Assume that at an arbitrary point in time designated the beginning of the first time interval of FIGURE 1, the system has an initial remainder $R_0$. Assume also that the system generates a difunction signal $\not{D}_1$ at this instant. Then, by definition, the remainder $R_1$ at the end of the first interval may be written as:

$$R_1=\Delta M_1+R_0-\not{D}_1 \qquad (1)$$

where $\Delta M_1$ represents the change in the variable quantity M during the first interval.

At the end of the first interval, a second difunction signal $\not{D}_2$ is generated and the new remainder $R_2$ at the end of the second interval is equal to:

$$R_2=R_1+\Delta M_2-\not{D}_2 \qquad (2)$$

Generalizing Equation 2 for a remainder $R_n$ at the end of the $n^{th}$ interval results in:

$$R_n=R_{n-1}+\Delta M_n-\not{D}_n \qquad (3)$$

or, substituting for $R_{n-1}$ the values that would be obtained in each of the succeeding equations, $$R_n=R_0+\sum_1^n \Delta M_i=\sum_1^n \not{D}_i \qquad (4)$$

$$=R_0+\Delta M_{(0-n)}-\sum_1^n \not{D}_i \qquad (5)$$

From Equation 5, it is readily observed that under the assumed initial conditions the summation of the difunction signals generated over $n$ units of time T will approximate the value of the total change $\Delta M_{(0-n)}$ of variable quantity M for time $n$T. In addition it is also readily observed from Equation 3 that the change in remainder during any interval can never exceed the quantity $(\Delta M_n-\not{D}_n)$ which, under the assumed conditions, is limited to +2 units of magnitude. Accordingly, the maximum magnitude of the remainder at the end of any time interval is equal to 2 units.

Reference is again made to FIGURE 1 to illustrate how the concepts and equations set forth above are applied to a difunction signal train generating system in order to represent the variable quantity M. As shown in the drawing, quantity M has an initial slope of one-half while remainder $R_0$ has an initial value of one-quarter. Assume also that the difunction signal starts from zero, and that the first difunction signal to be generated is a +1. This first difunction signal $\not{D}_1$ is indicated by that portion of dotted line 12 of FIGURE 1 which occurs during the first time interval.

At the end of the first time interval, the difunction signal train, represented by line 12, has a value of +1 while the variable M, represented by curve 11, has a value of +¾. Accordingly, from Equation 1, remainder $R_1$ is equal to −¼, as indicated by the graphical remainder representation, generally designated 13, during the second time interval, which represents the difference between curve 11 and difunction line 12 at the end of each interval. Since the remainder is negative, the system will generate a −1 difunction signal in order to drive the next remainder towards zero.

It should be pointed out that although the system is designed to generate a difunction signal which drives the remainder towards zero, and, therefore, according to Equation 5, makes the summation of the difunction signals over the entire interval of time equal to the magnitude of the total change in the variable quantity at the end of the interval, the difunction signal generated can be only ±1. Accordingly, there will be a number of instances in which the absolute magnitude of the remainder at the end of an interval will be greater than the absolute magnitude of the remainder at the end of the preceding interval. As will be pointed out more fully below, this limitation is inherent in the difunction system and is required in order to make the rate of change represented by the difunction signal train closely approximate the rate of change of variable quantity M.

Returning now to FIGURE 1, it is clear that difunction signal $\not{D}_2$ will be a −1, since remainder $R_1$ is negative. Accordingly, as shown in the drawing and as represented by Equation 2, remainder $R_2$ at the end of the second interval will be equal to $$R_1+\Delta M_2-\not{D}_2=-1/4+1/2-(-1)=1\tfrac{1}{4}$$

Therefore difunction signal $\not{D}_3$ will be a +1 and remainder $R_3=1\tfrac{1}{4}+\tfrac{1}{2}-1=+\tfrac{3}{4}$. Similarly signal $\not{D}_4$ and remainder $R_4$ are +1 and +¼, respectively; signal $\not{D}_5$ and remainder $R_5$ are +1 and −¼, respectively; and signal $\not{D}_6$ and remainder $R_6$ are −1 and +1¼, respectively.

At this point, namely at the end of the sixth time interval, difunction signal $\not{D}_6$ and remainder $R_6$ are identical with difunction signal $\not{D}_2$ and remainder $R_2$. Accordingly, since curve 11 representing quantity M has been chosen to have a constant slope of +½, the patterns of difunction signals and remainders will be repeated. In other words, difunction signals $\not{D}_7$ through $\not{D}_{10}$ are identical to difunction signals $\not{D}_3$ through $\not{D}_6$, respectively, and remainders $R_7$ through $R_{10}$ are identical to remainders $R_3$ through $R_6$, respectively. If the slope of curve 11 were to remain constant at +½, the system would continue to generate this same repetitive pattern of three +1's and one −1. However for the curve 11 shown in the drawing the system will continue to generate this same repetitive pattern until the end of the twelfth time interval at which time ΔM changes from +½ to +⅓.

Consider now the relative values of curve 11, difunction train 12 and remainder $R_{12}$ at the end of the twelfth interval. As shown in the drawing, quantity M is at a value of +6¼, difunction train 12 is at a value of +6 and remainder $R_{12}$ is equal to +¼. Accordingly, the system will generate a difunction signal $\not{D}_{13}$ equal to +1 and remainder $R_{13}$, from Equation 3, will be equal to $$R_{12}+\Delta M_{12}-\not{D}_{12}=+\tfrac{1}{4}+\tfrac{1}{3}-1=-\tfrac{5}{12}$$

as represented by train 13. Difunction $\not{D}_{14}$ is, therefore, equal to −1 and remainder $R_{14}$ is equal to $$-\tfrac{5}{12}+\tfrac{1}{3}+1=+\tfrac{11}{12}$$

Similarly, difunction signal $\not{D}_{15}$ is equal to +1 and remainder $R_{15}$ is equal to +¼.

Accordingly, at the end of the fifteenth interval, difunction signal $\not{D}_{15}$ and remainder $R_{15}$ are identical with difunction signal $\not{D}_{12}$ and remainder $R_{12}$, respectively. Since the slope of curve 11 remains constant at +⅓ for the next nine intervals, namely intervals 16 through 24, the patterns of difunction signals and remainders during this period will be identical with the patterns during the thirteenth through fifteenth intervals. In other words, the pattern of difunction signals will progress in the order +1, −1, and +1, while the pattern of the remainders will progress in the order −5/12, +11/12, +¼.

At the end of the twenty-fourth interval, the difunction train 12 is at a value of +10, quantity M, as represented by curve 11, is at a value of +10¼, and the remainder is +¼. Accordingly, difunction signal $\not{D}_{25}$ is +1 and remainder $R_{25}$ is equal to ¼+⅙−1=−7/12. Similarly, difunction signal $\not{D}_{26}$ and remainder $R_{26}$ are equal to −1 and +7/12, respectively; while difunction signal $\not{D}_{27}$ and remainder $R_{27}$ are equal to +1 and −¼, respectively. The remaining values for the difunction signals and the remainders should be readily ascertainable in the manner set forth above and are, therefore, merely tabulated below:

| Interval | Difunction | Remainder |
|---|---|---|
| 28 | −1 | +11/12 |
| 29 | +1 | +1/12 |
| 30 | +1 | −¾ |
| 31 | −1 | +5/12 |
| 32 | +1 | −5/12 |
| 33 | −1 | +¾ |
| 34 | +1 | −1/12 |
| 35 | −1 | +1 1/12 |
| 36 | +1 | +¼ |

Consider now the difunction signal train generated by the system in following curve 11 representing the variations in quantity M. It will be recalled from Equation 5 that the summation of the difunction train, as represented by line 12, will closely approximate the value of the variable quantity M, as represented by curve 11, and will never differ from the total change in quantity M by more than an absolute magnitude of two units. This statement is clearly borne out by remainder curve

13 of FIGURE 1. An even more significant result is obtained if both sides of Equation 5 are divided through by $n$T and the initial condition $$\frac{R_0}{nT}$$

is subtracted from both sides, one obtains:

$$\frac{R_n-R_0}{nT}=\frac{M_n}{nT}-\frac{\sum_1^n \not{D}_i}{nT}=(A_v\Delta M)_n-(A_v\not{D}_i)_n \qquad (6)$$

where $(A_v\Delta M)_n$ signifies the average rate of change of variable quantity M during $n$T intervals and $(A_v\not{D}_i)_n$ signifies the average value of the difunction signal train during the same number of intervals. Assuming a value of T equal to unity, therefore, signifies that the average value of the difuction signal train approximates the average slope of the variable M, the maximum difference between these averages being $$\pm\frac{4}{nT}$$

owing to the fact that each of remainders $R_0$ and $R_n$ has a maximum value of ±2, as previously set forth. Obviously, as the sampling interval $n$T is increased, the maximum error in the difunction average decreases until the error is essentially insignificant.

Furthermore, rewriting Equation 5 for $m$T intervals, one obtains:

$$R_m=R_0+\Delta M_{(0-m)}-\sum_1^m \not{D}_i \qquad (7)$$

and subtracting Equation 7 from Equation 5 yields:

$$R_n-R_m=\Delta M_{(0-n)}-\Delta M_{(0-m)}-\sum_1^n \not{D}_i-\sum_1^m \not{D}_i$$

$$=\Delta M_{(m-n)}-\sum_{m+1}^n \not{D}_i \qquad (8)$$

Dividing Equation 8 through by the number of time intervals represented, namely $(n-m)$T, yields:

$$\frac{R_n-R_m}{(n-m)T}=\frac{M_n-M_m}{(n-m)T}-\frac{\sum_{m+1}^n \not{D}_i}{(n-m)T}=(A_v\Delta M)_{n-m}-(A_v\not{D}_i)_{n-m} \qquad (9)$$

where $(A_v\Delta M)_{n-m}$ signifies the average rate of change of variable quantity M between interval $m$T and interval $n$T, and $(A_v\not{D}_i)_{n-m}$ signifies the average value of the difunction signal train during the same intervals. In this instance, the maximum value of the error $$\frac{R_n-R_m}{(n-m)T} \text{ is equal to } \pm\frac{4}{n-m}$$

Reference is again made to FIG. 1 to illustrate the applicability of Equations 6 and 9 to the average rate of change of quantity M illustrated by curve 11. As shown in the drawing, quantity M progressed from an initial value of +¼ to a final value of +12¼ in 36 intervals. Therefore the average rate of change of quantity M, or the average slope of curve 11, during the entire period is equal to +12/36 or +⅓. During the same period the difunction signal train included 24 +1 signals and 12 −1 signals. Therefore the average value represented by the difunction signal train is equal to $$\frac{+24-12}{36}$$

or +12/36 or +⅓. Similarly, at the end of twenty-four time intervals, quantity M has attained the value of +10¼, or a net average change of +5/12 while the average value of the difunction signal train is $$\frac{+17-7}{24}$$

or $+\frac{5}{12}$. It is thus seen that at the selected points, the average value of the difunction signal train is exactly equal to the average rate of change of quantity M over the intervals between the starting point and the selected points. In other words, at the selected points Equation 6 is fully satisfied with the remainder $R_n$ being exactly equal to the initial remainder $R_0$.

Consider now the applicability of Equation 9 to the drawings, utilizing the values established at the points specified in the preceding paragraph with $n$ equal to 36 and $m$ equal to 24. From the drawing the average rate of change of quantity M between the specified points is $+\frac{1}{6}$. On the other hand, the average rate of change indicated by the difunction signal train is equal to $$\frac{+7-5}{12}$$

or $+\frac{1}{6}$. Similarly, choosing $n$ as 24 and $m$ as 12, the average slope of quantity M is $+\frac{1}{3}$, while the average value of the difunction signal train during the interval is $$\frac{+8-4}{12}$$

or $+\frac{1}{3}$. It is thus seen that, between the selected points, the average value of the difunction signal train is exactly equal to the average rate of change of quantity M or the average slope of curve 11.

It should be noted that the points thus far selected have not been arbitrary but were selected for specific reasons. More particularly, both sets of points were chosen firstly because they represented constant slopes for curve 11, and secondly because it was known that both of the constant slopes could be represented exactly in twelve time intervals. It will now be demonstrated that the difunction signal train will accurately represent the slope of curve 11 even when the slope is not a constant and/or the average slope cannot be represented exactly in the number of time intervals selected.

Consider first the average slope of curve 11 between the first or initial point and any other point in comparison with the average value represented by the difunction signals, these latter values being indicated below curve 14. More particularly, the average slope of curve 11 during the first thirty-five time intervals is equal to $$\tfrac{1}{35}(12\tfrac{1}{12}-\tfrac{1}{4})=\tfrac{1}{35}(11\tfrac{5}{6})$$

On the other hand, the average value of train 14 during the same period is equal to $+\frac{11}{35}$. It will now be shown that the value of the difunction signal train approximates the average slope of curve 11 within the limits of accuracy set forth in Equation 6.

Assume that an arbitrary fraction $$\frac{a}{b}$$

is to be represented in $n$ time intervals, or in other words by a difunction signal train having $n$ signals of which $x$ are +1's and $(n-x)$ are −1's. Then by definition, the average value of the difunction signal train is equal to $$\frac{x-(n-x)}{n} \text{ or } \frac{2x-n}{n}$$

Equating the two values and solving for $x$, one obtains:

$$x=\frac{n}{2b}(a+b) \qquad (10)$$

In the selected examples, the denominator $b$ is exactly equal to $n$, that is the slope as measured over $n$ intervals, and Equation 10 may be rewritten as:

$$x=\tfrac{1}{2}(a+b) \qquad (11)$$

$$=\tfrac{1}{2}(a+n) \qquad (12)$$

Solving Equation 12 for the slope of curve 11 over thirty-five intervals yields:

$$x=\tfrac{1}{2}(11\tfrac{5}{6}+35)$$
$$=\tfrac{1}{2}(46\tfrac{5}{6})$$

Since $x$ must be an integer, it is apparent that the average value of the difunction signal train over a period of thirty-five intervals cannot exactly represent the average slope of the curve over the period. In fact the closest possible values for $x$ are 22, 23, and 24 for which the average values of the train would be $\frac{9}{35}$, $\frac{11}{35}$, and $\frac{13}{35}$, respectively. It is, therefore, seen that difunction signal train 14 for the first thirty-five intervals shown in the drawing has an average value ($\frac{11}{35}$) which most closely approximates the average slope of curve 11 within the limits of accuracy of the system and has an error of less than $\frac{1}{35}$.

Similar approximations are made by train 14 during all of the other intervals. For example, the average slopes of curve 11 at the ends of the thirty-fourth, thirty-third, and thirty-second intervals are $\frac{1}{34}(11\frac{1}{6})$, $\frac{1}{33}(11\frac{1}{2})$, $\frac{1}{32}(11\frac{1}{3})$, respectively, while the corresponding averages of difunction train 14 are $\frac{6}{17}$ or $\frac{12}{34}$, $\frac{1}{3}$ or $\frac{11}{33}$ and $\frac{3}{8}$ or $\frac{12}{32}$, respectively. In fact, at a number of points, namely the ends of the fourth, eighth, twelfth, fifteenth, eighteenth, twenty-first, twenty-fourth and thirty-sixth intervals, the average values of train 14 are exactly equal to the slopes of curve 11.

It is important to note under what conditions the average value of difunction signal train 14 will be exactly equal to the average slope of curve 11. With reference to Equations 11 and 12, it is readily seen that since $x$ must be an integer, the slope can be exactly represented whenever the sum of the numerator and denominator of the arbitrary fraction to be represented is equal to an even number. In other words, at the ends of the fourth, eighth, twelfth, fifteenth, eighteenth, twenty-first twenty-fourth, and thirty-sixth intervals, where the slopes of curve 11 are $\frac{2}{4}$, $\frac{4}{8}$, $\frac{6}{12}$, $\frac{7}{15}$, $\frac{8}{18}$, $\frac{9}{21}$, $\frac{10}{24}$, and $\frac{12}{36}$, $x$ is an integer and the average of difunction signal train 14 exactly represents the average slope of curve 11. In addition, it should be noted that during the first twelve intervals when the slope of curve 11 is contant at $\frac{1}{2}$, difunction train 14 follows a repetitive pattern of +1, −1, +1, +1 whose average value is exactly equal to the slope of curve 11 at the end of each period of four intervals.

From these observations and from Equation 10, it can be readily determined that for any constant slope $$\frac{a}{b}$$

the difunction train will exactly represent the slope at a number of points, and that these points will be at periods from the starting point which are integral multiples of $n_0$ where $n_0$ is the least number of time intervals required to represent $$\frac{a}{b}$$

and is defined as $2b$ when the sum of $a$ and $b$ is odd, and $b$ when the sum of $a$ and $b$ is even. In the illustration used in the last paragraph, a slope $$\frac{a}{b}$$

equal to $\frac{1}{2}$ requires a minimum number $n_0$ of time intervals equal to $2b$ or 4 in order for a difunction train to exactly represent the slope. This minimum period $n_0$ may be referred to as a recurrence interval and the pattern established therein may be termed a recurrence pattern.

Although the concepts of recurrence intervals and patterns have been set forth only for a constant slope of $\frac{1}{2}$, they are equally applicable to all other slopes within the ranges contemplated for the system. For example, consider curve 11 during the thirteenth through twenty-fourth interval, when the slope $$\frac{a}{b}$$

is equal to $\frac{1}{3}$. By definition, the minimum recurrence period $n_0$ for this slope is equal to 3 time intervals. This conclusion is clearly borne out by the drawing wherein train 14 has a recurrence pattern of +1, −1, +1 for four periods $n_0$. Similarly, during the twenty-fifth through thirty-sixth time intervals, when the slope $$\frac{a}{b}$$

of curve 11 is equal to $\frac{1}{6}$, and twelve time intervals are required for the recurrence period $n_0$ no repetitive pattern is established for the difunction signal train.

It is of importance to note one further point in connection with the slope of curve 11 during the last twelve time intervals. It has been pointed out that the recurrence period required is twelve time intervals, but no statement has been made regarding the pattern or patterns established during this period. Consider now in detail the signals of difunction signal train 14 during this period and its relationship to previously established patterns.

It will be noted that during intervals twenty-five through twenty-seven, the pattern is precisely the same as that occurring during the recurrence period equivalent to a slope of $\frac{1}{3}$. A similar resemblance can be observed for the pattern during intervals thirty through thirty-two. On the other hand, the pattern occurring during the intervals twenty-eight and twenty-nine is −1, +1 which has an average value of $$\frac{1-1}{2}$$

or zero. A similar pattern is established for each pair of intervals of the last four intervals, that is two recurrence patterns of +1, −1 having an average value of zero. Accordingly, the last twelve signals of difunction signal train 14 include two recurrence patterns of +1, −1, +1 or $\frac{1}{3}$ and three recurrence patterns of −1, +1 or zero, the average of these patterns being one-twelfth of the sum of $\frac{1}{3}$ for six intervals and zero for six intervals or $$\frac{6(\frac{1}{3})+6(0)}{12}$$

or $\frac{2}{12}$ or $\frac{1}{6}$.

It is, therefore, apparent that the difunction signal train will have an average value which closely follows the average slope of a constantly increasing curve 11, regardless of the actual value of the slope. It is obvious that the difunction signal train would follow a constantly decreasing slope equally as well. It has also been demonstrated that the difunction signal train closely follows the slope of the curve even though the curve progresses. It remains to be shown that Equation 9 is continuously followed for a fixed number of sampling time intervals $(n-m)$, as both $n$ and $m$ progress. In other words, it remains to be shown that signal difunction train 14 presents a continuous moving average of the slope of curve 11 during each sampling period.

Assume now a sampling period of ten intervals, that is $(n-m)$ equal to 10. Under these conditions consider the average value represented by train 14 and the slope of curve 11 as $n$ progresses from ten time intervals upward. Since curve 11 has a constant slope of $\frac{1}{2}$ for the first twelve intervals, then the slope of curve 11 remains constant for the first three sampling periods, that is for $n$ equal to 10, 11 and 12. On the other hand, as indicated by the number beneath the tenth signal of difunction signal train 14, the average represented by the train during the first sampling period is equal to $\frac{2}{5}$.

It will be recalled that the average value of a difunction signal train having $n$ signals of which $x$ represent +1 is $$\frac{2x-n}{n}$$

In the instant case, where $n$ is assumed to be 10, the average values which may be obtained are $$\frac{2x-10}{10}$$

Since $x$ has been defined as an integer, the difunction train can represent only even number of tenths. Accordingly, a slope of $\frac{1}{2}$ or $\frac{5}{10}$ can be represented only approximately by a 10-signal difunction train either as $\frac{4}{10}$ where $x$ is 7, or as $\frac{6}{10}$ where $x$ is 8. In the drawing difunction signal train 14 represents the slope of curve 11 during the first ten intervals as $\frac{4}{10}$ or $\frac{2}{5}$. Similarly, for the periods of intervals 2 through 11 and 3 through 12, difunction signal train 14 represents the slope $\frac{5}{10}$ as $\frac{4}{10}$ and $\frac{6}{10}$, respectively.

Thereafter, as set forth above, the instantaneous slope changes from $\frac{1}{2}$ to $\frac{1}{3}$ and remains constant at $\frac{1}{3}$ for twelve intervals. Accordingly, the average slope for each period of ten time intervals will progressively decrease from $\frac{1}{2}$ to $\frac{1}{3}$. It will now be demonstrated that the average number represented by each group of ten difunction signals will be a moving average of these progressively decreasing slopes.

Consider first the average slope of curve 11 between the fourth through thirteenth intervals and the corresponding average value represented by difunction signal train 14. As shown in the drawing, the average slope of curve 11 during the selected period is $\frac{1}{10}(6\frac{7}{12}-1\frac{3}{4})$ or $\frac{1}{10}(4\frac{5}{6})$, while the average value represented by the train is $\frac{1}{10}(8-2)$ or $\frac{6}{10}$. Therefore the average represented by difunction signal train 14 accurately represents the average slope of curve 11 during the selected period. Similarly, the average slope of curve 11 during the fifth through fourteenth intervals is $\frac{1}{10}(6\frac{11}{12}-2\frac{1}{4})$ or $\frac{1}{10}(4\frac{2}{3})$, while the difunction signal train average is $\frac{1}{10}(7-3)$ or $\frac{4}{10}$. For the next five sampling periods of the average slopes of curve 11 are $\frac{1}{10}(4\frac{1}{2})$, $\frac{1}{10}(4\frac{1}{3})$, $\frac{1}{10}(4\frac{1}{6})$, $\frac{1}{10}(4)$, and $\frac{1}{10}(3\frac{5}{6})$, respectively, while the corresponding averages represented by difunction signal train 14 are $\frac{4}{10}$, $\frac{6}{10}$, $\frac{4}{10}$, $\frac{4}{10}$, and $\frac{4}{10}$, respectively.

It is, therefore, seen that the moving average represented by difunction signal train 14 during successive periods accurately represents the changes in average slopes of curve 11. In fact, during the periods when the slopes remain constant at $\frac{1}{2}$, that is the first four sampling periods, the moving averages are $\frac{4}{10}$, $\frac{4}{10}$, $\frac{6}{10}$, and $\frac{6}{10}$, respectively, with an average of $\frac{5}{10}$ or $\frac{1}{2}$. In addition, as the slopes progressively decrease to $\frac{1}{3}$, the moving averages decrease to $\frac{4}{10}$ and finally to a value of $\frac{2}{10}$ during the period between the fourteenth and twenty-third intervals.

In summary, therefore it has been demonstrated that a difunction signal train can accurately represent the average rate of change of a variable quantity whenever the maximum rate of change of the quantity per unit time interval does not exceed the number represented by each signal of the train. This accurate representation may be either in the form of an overall average starting from an initial point and progressing on indefinitely, or in the form of a moving average in which the train reproduces the average rate of change during successive periods and ignores the past history of the quantity. In addition it has been shown that the summation of the difunction signal train continuously and accurately represents the total change in the variable quantity. In other words, if the initial position or condition of the quantity is taken into account, the summation of the difunction signal train can accurately and continuously represent the final position of the quantity. Finally, it should be apparent that the difunction theory is applicable to measuring quantities other than rate of change. Stated differently, if the difunction signal generating system were arranged to generate difunction signals representing instantaneous position or condition of an instrument, then the moving averages would continuously and accurately represent average position.

Although the explanation set forth has assumed that the maximum rate of change of the quantity does not exceed the number represented by each difunction signal, it should be evident that this limitation need not be rigorously imposed upon the system. More particularly, it is quite evident that greater rate of change could be accepted by the system so long as these rates are not continued indefinitely. In fact, if these rates are sparsely interspersed they will have a minor effect upon the summation of the difunction train and an essentially negligible effect upon the moving averages. In addition, in the case of moving averages even a number of excess rates will have only a temporary effect if they are continued for only a short period of time.

As a final statement, a difunction signal train will be re-compared with conventional numerical signal trains in view of the additional information presented above. It has been stated previously that the two types of signal trains are basically distinct in that the signals of a difunction train are unweighted and non-numerical. Because of this fact, it should be evident that loss of or error in a signal of the difunction signal train has very little significance as compared with a similar loss or error in a conventional numerical signal train. For the same reason a difunction signal train continuously presents a moving average regardless of the starting point. On the other hand, in a numerical signal train, the starting point is necessarily fixed to either the most or least significant digit signal and any shift in this starting point produces completely erroneous results. Similarly, the sampling periods in a numerical system are of necessity fixed and limited and there is no possibility of obtaining continuous moving averages. Finally, since each difunction signal represents maximum rate in either one direction or the other, relatively simple linear actuators are required for response to such signals. On the other hand, conventional numerical signal trains require complex conversion devices before the information can be utilized. In fact in a number of systems employing numerical signal trains it has been found that speed of response and simplicity of equipment requires that only the most significant digit signal be utilized. In such instances the superiority of difunction signal trains is obvious, since only the most significant digit signal is generated.

Figures 2, 3, 4:
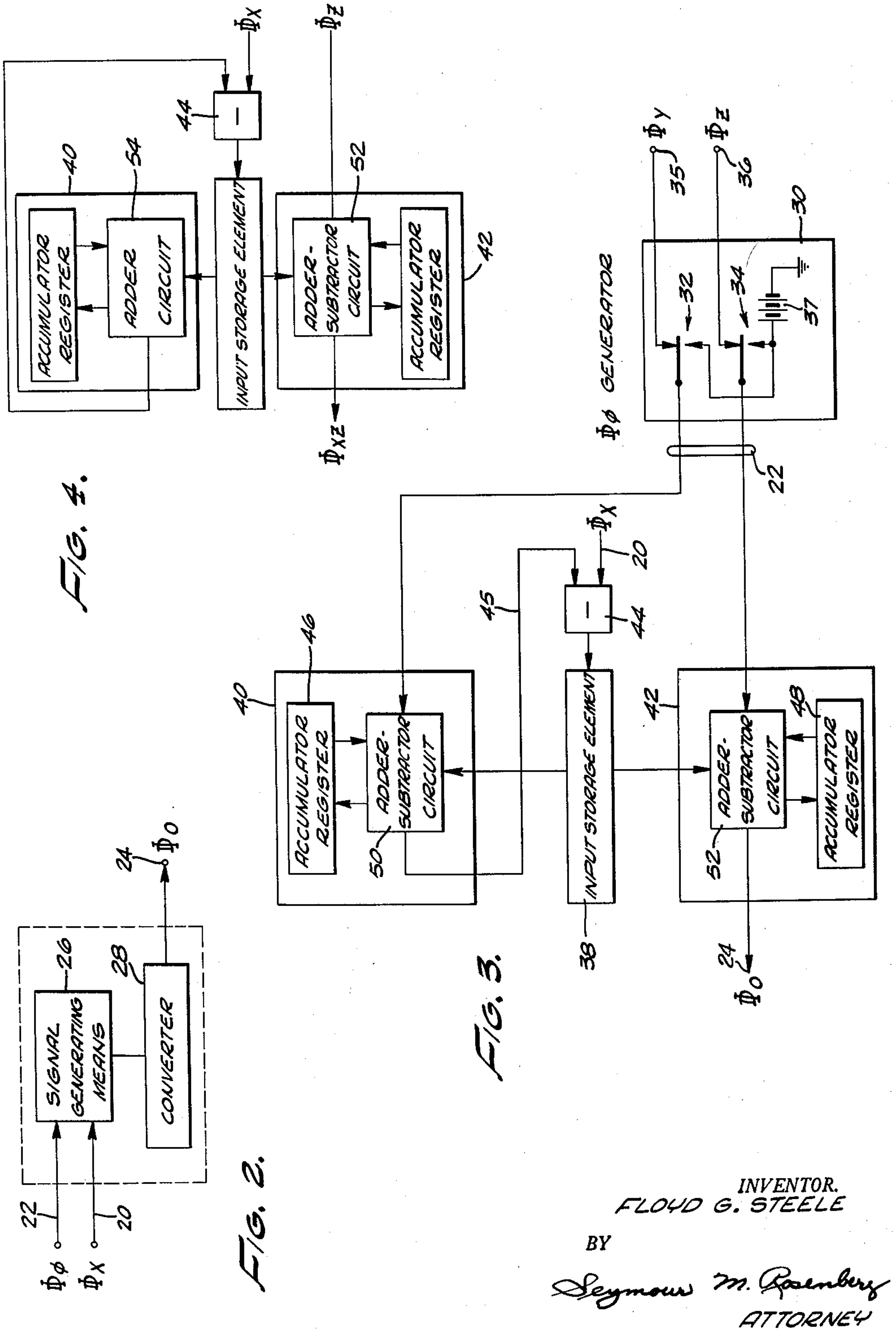
FIG. 2 is a functional block diagram of a difunction multiplier-divider, according to the invention, illustrating its basic mode of operation.
FIG. 3 is a structural block diagram of a difunction multiplier-divider, according to the invention, illustrating the basic components of the device and the manner in which they are intercoupled.
FIGS. 4 and 5 are modifications of the block diagram of FIG. 3 illustrating how the structure of FIG. 3 may be altered to provide a difunction multiplier or a difunction divider, respectively.

With reference once more to the drawings, wherein like or corresponding parts are designated by the same reference characters throughout the several views, there is shown in FIG. 2 a functional block diagram of a difunction multiplier-divider, according to the invention, which is operative to combine a first input difunction signal train $D\!\!\!/_X$ with one or more second input difunction signal trains, generally designated as a composite signal train $D\!\!\!/_\phi$, which are applied over an input conductor 20 and an input bus 22, respectively, to produce at an output terminal 24 an output difunction signal train $D\!\!\!/_0$ consonant with the input difunction signal trains and non-numerically representative of one or both of the mathematical operations of multiplication and division upon the numerical equivalents of the quantities non-numerically represented by the input difunction signal trains. According to the fundamental and motivating concept of the invention, the difunction multiplier-divider herein disclosed includes two basic functional elements, namely a signal generating network 26 which is responsive to the input difunction signal trains for generating electrical signals which are numerically representative of the product and/or the quotient of the numerical equivalents of the quantities represented by the input difunction signal trains, and a converter 28 which is operative to transform the electrical signals generated by network 26 into a difunction output signal which is non-numerically representative of the result of the mathematical operation performed.

In accordance with the invention, as will be disclosed more fully hereinafter, composite signal train $D\!\!\!/_\phi$ may include a single second input difunction signal train $D\!\!\!/_Y$, a single second input difunction signal train $D\!\!\!/_Z$, or a pair of second inut difunction signal trains $D\!\!\!/_Y$ and $D\!\!\!/_Z$. In each instance, however, signal generating network 26 comprises elements capable of generating electrical signals representative of one of the above-mentioned mathematical operations upon the numerical equivalents of first difunction signal train $D\!\!\!/_X$ and composite second difunction signal train $D\!\!\!/_\phi$. More particularly, if composite difunction signal train $D\!\!\!/_\phi$ includes only signal train $D\!\!\!/_Y$ or signal train $D\!\!\!/_Z$, then signal generating network 26 is operative to combine the two signal trains and produce electrical signals numerically representative of either the quotient or the product, respectively of the numerical equivalents of the two input trains. On the other hand, if composite difunction signal train $D\!\!\!/_\phi$ includes both signal trains $D\!\!\!/_Y$ and $D\!\!\!/_Z$, then signal generating network 26 and is operative to produce electrical signals numerically representative of the product of the numerical equivalents of first input difunction signal train $D\!\!\!/_X$ and one of the second input difunction signal trains, divided by the numerical equivalent of the other of the second input difunction signal trains.

It should be emphasized that the block diagram of FIG. 2 is a functional diagram which illustrates the basic mode of operation of the difunction multiplier-divider of the invention, and that in certain embodiments of the invention to be described hereinafter the structure of signal generating network 26 and converter 28 are integrally combined, whereas in other embodiments of the invention both elements exist as separate entities. In either instance, however, the mode of operation is the same in that a composite electrical signal numerically representative of the result of the mathematical operation being performed is generated first, the output difunction signal $D\!\!\!/_0$ then being generated as a function of the composite signal.

In all of the various embodiments of the invention to be subsequently described the output difunction signal train is consonant with the input difunction signal trains, as set forth hereinabove with respect to the basic multiplier-divider shown in FIG. 2. In other words, one output difunction signal is produced for each set of difunction signals received, the number of signals included in the output difunction signal train over a given interval being equal to the number of signals appearing in each of the input difunction signal trains during the corresponding interval.

It should be here pointed out that the phrase "quantity represented by a difunction signal train" refers to the quantity numerically represented by the average value of the difunction signal train over a predetermined number of sampling or digit time intervals, and that this average is a moving average which progresses with time; in other words, the difunction signals in the difunction signal train which are tabulated in obtaining the average, which corresponds numerically to the quantity represented, are that predetermined number of sequential difunction signals which have last occurred in time.

Assume, for example, that it is desired to obtain the moving average over 100 digit time intervals of a difunction signal train which is cyclically repetitive with three (+1)s and one (−1). It will be recalled from the description of FIG. 1 that the value of these four signals is $$\frac{+1+1+1-1}{4}=\frac{1}{2}$$

If this difunction signal train has been generated for more than 100 successive digit time intervals, the numerical equivalent of the quantity non-numerically represented by the difunction signal train is ½. Moreover, each time a new difunction signal appears in the train it is included in the average, while the (+1) or (−1) represented by the difunction signal which occurred one hundred and one digit time intervals past is removed or dropped from the average.

Assume now that at some point in time the difunction signal train changes its repetitive pattern to represent a numerical value other than ½; for example, assume that the train becomes cyclically repetitive with two (+1)s followed by a (−1), which when averaged represents $$\frac{+1+1-1}{3}=\frac{1}{3}$$

As soon as the first three signals of this modified pattern have been received, the moving average of the difunction signal train taken over the last 100 intervals will decrease from its previous value of ½ and will progressively move toward the value of ⅓ as additional difunction signals are received until, after approximately 100 difunction signals generated according to the new pattern have been received, the value of the moving average over the last 100 digit time intervals will be ⅓.

In view of the foregoing discussion it should be clear that the difunction multiplier-dividers of the invention are operative to produce an output difunction signal which represents the result of a mathematical operation performed on the numerical values represented by the moving average of the input difunction signal trains taken over a predetermined number of digit time intervals. Accordingly, as time progresses the output difunction signal train being generated is no longer dependent upon or cognizant of the input difunction signals in the input trains which occurred prior to the period over which the moving average is being taken.

One of the most significant advantages of the fact that the difunction multiplier-dividers of the invention are responsive to a moving average of the input difunction signal trains is that the operation of the multiplier-dividers is made independent of the initial conditions of the instruments or mechanisms which are generating the input difunction signal trains. For example, assume that one of the input difunction signal trains is representative of the speed of an aircraft which is moving at a velocity of 600 miles per hour. Assume now that a computer system embodying one or more difunction multiplier-dividers of the invention is then turned on to solve a specified problem involving air speed. As soon as a sufficient number of signals in the input difunction signal train representing airspeed have been received, the computer system is capable of generating output signals representative of the solution of the problems regardless of the fact that no initial conditions were set into the computer system. In other words, the moving average of the input difunction over the predetermined number of cycles will equal a numerical fraction representative of an airspeed of 600 miles per hour.

With reference to FIG. 3, there is shown one physical embodiment of a difunction multiplier-divider, according to the invention, which is operative to combine an input difunction signal train $\not{D}_X$, received over an input conductor 20, with one or more input difunction signal trains received over a bus 22 from a $\not{D}_\phi$ generator 30, to produce at an output terminal 24 an output difunction signal train $\not{D}_0$ which may be representative of any one of the three mathematical operations specified above, depending upon the condition of $\not{D}_\phi$ generator 30. As shown in FIG. 3, $\not{D}^\phi$ generator 30 includes a pair of switches 32 and 34, respectively, each having an armature, a front contact normally engaged by the associated armature, and a back contact, the armatures of the switches being connected to input bus 22 while their front contacts are respectively connected to a pair of input terminals 35 and 36 for receiving the pair of second input difunction signal trains $\not{D}_Y$ and $\not{D}_Z$, respectively. The back contacts of switches 32 and 34 are in turn connected to a source of a relatively high potential such as a battery 37.

It will be recognized that if either of switches 32 and 34 is actuated so that its armature engages its associated back contact the relatively high voltage applied to its associated conductor of bus 22 simulates a difunction signal whose value is (+1), or in other words, simulates a difunction signal train composed of an infinite number of (+1) signals. Conversely, when the armature of a switch engages its associated front contact, the difunction input signal train applied to its associated input terminal is in turn applied to the multiplier-divider of the invention. Accordingly, the quantity non-numerically represented by output difunction signal train $\not{D}_0$ is dependent upon the setting of switches 32 and 34 in accordance with the following table.

TABLE I

| Position of switch 32 | Position of switch 34 | Value of output difunction train $\not{D}_0$ | Mathematical operation performed |
|---|---|---|---|
| Front contact | Front contact | $\not{D}\frac{XZ}{Y}$ | Multiplication and division. |
| Back contact | do | $\not{D}XZ$ | Multiplication. |
| Front contact | Back contact | $\not{D}\frac{X}{Y}$ | Division. |

The difunction multiplier-divider shown in FIG. 3 may operate in either a parallel or serial manner, as will be described hereinafter with regard to FIGS. 6 and 12; basically the difunction multiplier divider includes an input storage element 38 for storing a composite electrical signal representative of a binary number, a pair of electronic accumulators 40 and 42 connected to input storage element 38 and operative to periodically combine the composite signal stored in the input storage element with composite signals stored in the accumulators, and a difunction subtractor 44 which is connected to input storage element 38 and which is operative to apply to the storage element an output difunction signal representative of the difference between input difunction signal train $\not{D}_X$ and an overflow difunction signal train received from accumulator 40 over an overflow output conductor 45.

Each of accumulators 40 and 42 includes an accumulator register and an electronic adder-subtractor circuit, the accumulator registers being respectively designated 46 and 48, while the adder-subtractor circuits are designated 50 and 52, respectively. Each of accumulator registers 46 and 48 has a predetermined capacity and is employed for storing, either serially or in parallel, a composite electrical signal representative of a binary number. The phrase "predetermined capacity," as herein utilized, denotes that each register is capable of storing only a predetermined number of binary digit signals, the binary digit signals stored therein constituting the composite signal stored in the accumulator.

Each of adder-subtractor circuits 50 and 52 intercouples input storage element 38 with its associated accumulator register, and is selectively operable under the control of the level of the input difunction signal train received from $\not{D}_\phi$ generator 30 for periodically combining the composite signal stored in the input storage element with the composite signal stored in its associated register to produce a composite result signal which in turn is stored in the associated register, replacing the composite signal previously stored therein. More specifically, when the difunction signal received by an adder-subtractor circuit during a particular digit time interval is at its high level value representing a (+1) the adder-subtractor circuit is operative to produce and store in its associated accumulator register a composite result signal representative of the sum of the binary numbers represented by the composite signals received from the associated register and the input storage element; conversely, when the difunction signal received by an adder-subtractor circuit is at its low level value representing a (−1) during a particular digit time interval, the adder-subtractor circuit is operative to produce a composite result signal representative of the difference between the binary numbers represented by the composite signals received from its associated register and the input storage element.

In addition to including elements for combining the composite signals received from the input storage element with the composite signal stored in its associated accumulator register, each of adder-subtractor circuits 50 and 52 also includes an overflow circuit which is connected to an output conductor, the output conductor to adder-subtractor 50 being the previously described conductor 45 which is connected to difunction subtractor 44 while the output conductor from adder-subtractor 52 presents the difunction output signal from the difunction multiplier-divider of the invention. The purpose of the overflow circuits as will be disclosed hereinbelow, is to present on the overflow output conductor during the following difunction time interval the overflow or carry digit from the arithmetic operation on the last or most significant digits of the numbers combined by the adder-subtractor circuits. In operation each of the adder-subtractor circuits is operative to present a relatively low level signal representative of a (−1) on its overflow output conductor when the complete composite result signal generated in the adder-subtractor circuit is storable in its associated accumulator register, and to present a relatively high level signal representative of a (+1) on its output conductor when the composite result signal generated exceeds the capacity of its associated accumulator register.

Stated differently, if it is assumed that each of accumulator registers 46 and 48 has a capacity of $n$ binary digit signals, the output signal from each adder-subtractor circuit represents the $(n+1)^{th}$ digit of the binary result of the arithmetic operation performed by the adder-subtractor circuit. From still another aspect it may be shown that the number represented by the signals stored in an accumulator register corresponds to the numerical remainder of the summation of the results of a continuous multiplication process wherein the input difunction applied to the associated adder-subtractor circuit is multiplied by the number stored in the input storage element, the most significant digits of the summation being represented in difunction form by the overflow signals sequentially appearing on the overflow output conductor of the adder-subtractor circuit.

It will be recognized, of course, that the structure of input storage element 38 and accumulator registers 46 and 48 may take any of numerous forms well known to the art. For example, these three elements may comprise tracks or channels on a magnetic drum circulating register, or may comprise a plurality of bistable storage elements, such as flip-flops, which are operative to receive, store and present binary digit signals representative of binary numbers. In addition, input storage element 38 also includes an additional mechanism, either integral with or ancillary to its memory unit, for incrementally changing the magnitude of the number stored therein in accordance with the output signal from difunction subtractor 44. Thus, for example, storage element 38 may comprise a count-up count-down counter, as will be described subsequently with regard to FIG. 6, or may comprise a shifting register and serially operable adder-subtractor circuit, as will be disclosed hereinafter with respect to the embodiment of the invention shown in FIG. 12.

Adder-subtractor circuits 50 and 52 may also be any conventional arithmetic elements known to the art, and may be operable either serially or as parallel units, as hereinafter disclosed with respect to FIGS. 12 and 6, respectively, depending upon whether the accumulator registers and input storage element are serial or parallel devices. One form of suitable serial adder-subtractor which may be utilized in the adder-subtractor circuits is shown in FIG. 12 of U.S. Patent No. 2,609,143, issued September 2, 1952 to George Stibitz, Jr., for "Electronic Computer for Addition and Subtraction," while a suitable form of parallel adder-subtractor is disclosed in FIGS. 13–21 and 13–24 in Chapter 13 of the book entitled "High Speed Computing Devices" by Engineering Research Associates, Inc., published in 1950 by the McGraw-Hill Book Co. of New York.

As indicated previously, adder-subtractor circuits 50 and 52 also include an overflow circuit for storing the carry digit resulting from the arithmetic operation upon the most significant digits of the binary numbers combined by the adder-subtractor utilized in the adder-subtractor circuits. In practice, as set forth in more detail below, the overflow circuit may merely comprise a flip-flop or the like for storing the last carry signal during the following difunction time interval.

In this way the carry output signal produced during any difunction time interval from the combining of said most significant digits of the binary numbers, is immediately stored and thereby made available for use throughout the following difunction interval. It will be understood in this connection, as appears in more detail herebelow, that the various operations of the multiplier-divider of the invention are repeated at each successive difunction interval. During any difunction interval subtractor 44 differences the two signals applied thereto to form a difference difunction signal; the contents of storage element 38 are increased or decreased in accordance with the output signal of difunction subtractor 44, the contents of storage element 38 are selectively added or subtracted by adder-subtractor 50 from the contents of accumulator register 40 (in accordance with the applied signal of train $\not{D}_Y$), and the contents of storage element 38 are also added or subtracted from the contents of accumulator register 48 (in accordance with the applied signal of train $\not{D}_Z$). Also as herebelow explained, the highest order digit carry resulting from the combining of the contents of 38 and 40 during the difunction interval is immediately stored in the overflow circuit included within adder-subtractor 50 and is retained there for the purpose of being applied to difunction subtractor 44 during the next difunction interval. Thus during each difunction time interval, difunction subtractor 44 has applied thereto the stored highest order digit carry which was formed during the preceeding difunction interval. Through the simple repetition of the described operations at each difunction time interval (designated herebelow as a digit time interval) the functions of the multiplier-divider of the invention are accomplished.

Figure 12:
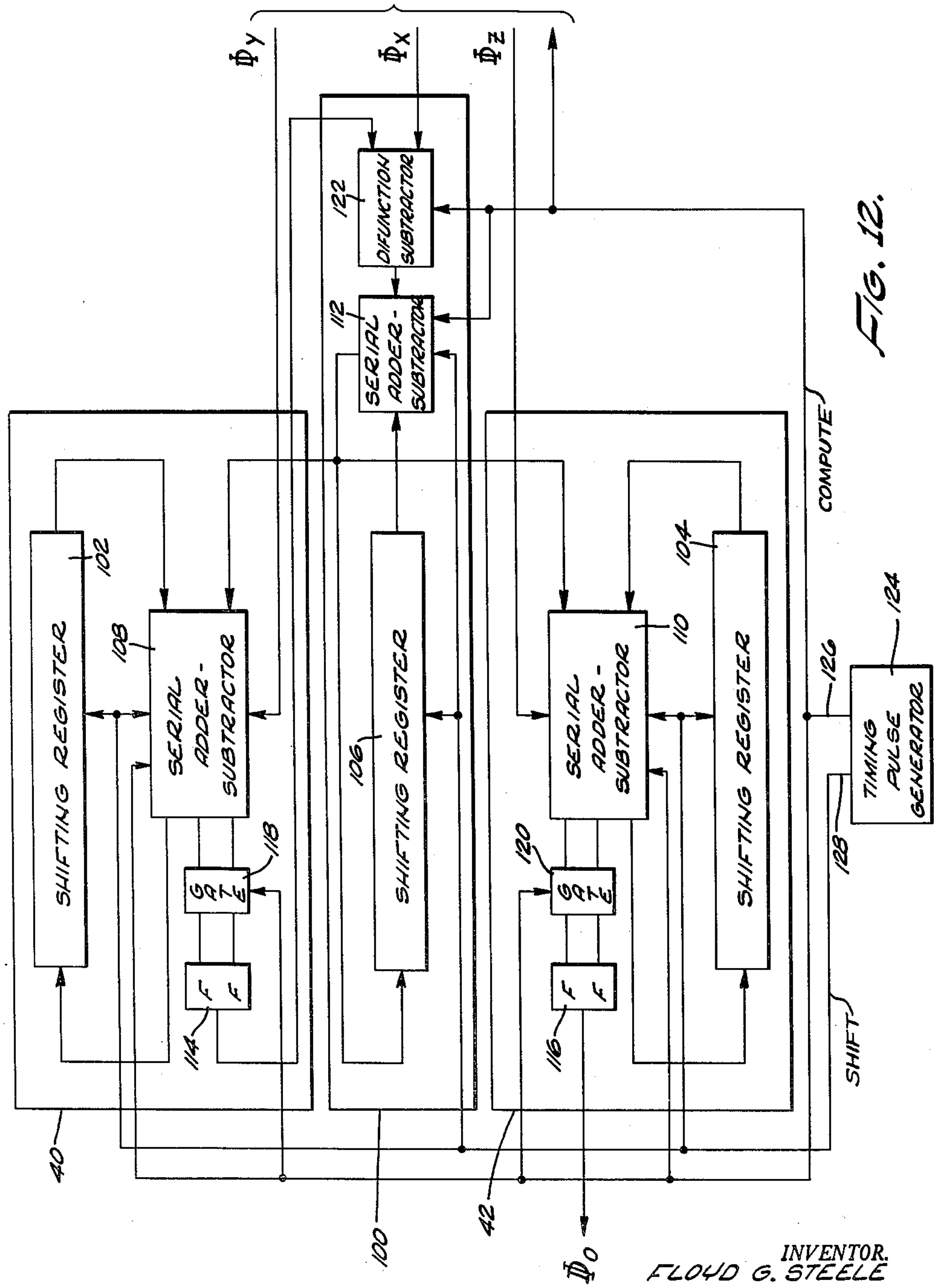
FIG. 12 is a block diagram of a serially operable difunction multiplier-divider, according to the invention.

As appears herebelow, in connection with FIG. 12, in a serial embodiment of the invention, in which the corresponding binary digits of storage element 38 and accumulator register 46 are sequentially applied, digit by digit, to adder-subtractor circuit 50 and sequentially operated upon, the successive digit carries are sequentially formed at a common output throughout each difunction interval and it is necessary therefore in each difunction interval to distinguish the highest order digit carry signal from other carries produced so that only the highest order digit carry is stored in the overflow circuit. As is specifically shown in FIG. 12, the described overflow circuit may, in addition to a storage flip-flop (shown as flip-flop 114) also include an associated selection gate (shown as gate 118) to which all of the various carry signal signals are applied but which is opened only once per difunction interval, by application thereto of a timing pulse (along a conductor 126) at the appropriate time, so as to pass only the highest order digit carry signal to the flip-flop.

It will be clear that in a parallel embodiment of the invention, such as is specifically described in connection with FIG. 6, in which all binary orders are simultaneously combined, no selection gate is required, since in such a parallel device the carries arising from the various binary orders are produced on separate output lines and therefore the overflow circuit storage flip-flop may be connected to the appropriate output line so as to directly receive the carry signal resulting from the most significant digits. Thus in a parallel embodiment the overflow circuit may be considered to comprise merely an additional or extra stage of the accumulator register, connected to receive the carry from the preceding nominally highest order stage. It may thus merely be an $(n+1)^{th}$ stage of a nominal $n$ stage parallel accumulator.

Further, more detailed discussion of the manner in which prior art accumulator registers and adder-subtractors may be suitably utilized in the electronic accumulators 40 and 42 of the invention, will be found hereinbelow in connection with the description of FIGS. 6 and 12.

Difunction subtractor 44, for example, may be similar to the difunction subtractor shown in FIG. 7 and described hereinbelow. Stated briefly, the difunction subtractor, in subtracting a first difunction signal $\mathcal{D}_1$ from a second difunction signal $\mathcal{D}_2$, functions in accordance with the following table:

TABLE II

| Minuend $\mathcal{D}_2$ | Subtrahend $\mathcal{D}_1$ | Result | Output difunction representation |
|---|---|---|---|
| +1 | −1 | +2 | Plus one. |
| −1 | +1 | −2 | Minus one. |
| +1 | +1 | 0 | Any two successive zeros represented as an alternate (+1) and (−1). |
| −1 | −1 | 0 | |

It will be noted that when the result is a +2 or a −2, the difunction output signal from the difunction subtractor can only represent the instantaneous result with a maximum of either +1 or −1, respectively. Consequently the average value of the difunction subtractor output signal represents, in reality, only one half of the actual difference between the values represented by the two input difunction trains.

Consider now the operation of the difunction multiplier-divider shown in FIG. 3. In order to faciltiate the description of operation it will be assumed that switches 32 and 34 within $\mathcal{D}_\emptyset$ generator 30 are both in their normal positions so that their armatures engage their associated front contacts, thereby applying input difunction signal trains $\mathcal{D}_Y$ and $\mathcal{D}_Z$ to adder-subtractor circuits 50 and 52, respectively. It will also be assumed that initially the accumulator registers and input storage element 38 each have the binary number zero stored therein, and that the signals in input difunction signal trains $\mathcal{D}_X$, $\mathcal{D}_Y$ and $\mathcal{D}_Z$ are cyclically repetitive whereby the three input signal trains respectively represent any three constant fractions.

It may be shown that the difunction output signal from adder-subtractor circuit 50 represents a rate which is equal to $\mathcal{D}_{nY}$, where $n$ is the number stored in input storage element 38 and Y is the quantity represented by the input train to adder-subtractor circuit 50. This signal is applied over conductor 45 to difunction subtractor 44 wherein it is subtracted from input difunction signal train $\mathcal{D}_X$, the output signal from the difunction subtractor being applied to the input storage element to complete a digital feedback loop. Inasmuch as it has been assumed that initially the number stored in the input storage element is zero, it is clear that initially the difunction rate $\mathcal{D}_X$ will exceed the difunction overflow rate from accumulator 40, or in other words, will include more (+1)s over a given interval than the overflow difunction signal. Consequently the difunction output signal from difunction subtractor 44 will be operative to increase the number stored in the storage element.

It will also be recognized that as long as the rate represented by input difunction $\mathcal{D}_X$ is greater than the overflow difunction rate represented by $\mathcal{D}_{nY}$, the average value of the number $n$ in storage element 38 will continue to increase, and that each increase in $n$ will be reflected as an increase in the overflow difunction rate $\mathcal{D}_{nY}$. It is clear, therefore, that the number stored in the input storage element will change exponentially until the rate $\mathcal{D}_{nY}=\mathcal{D}_X$. Thereafter any tendency for the number $n$ to increase will cause the rate $\mathcal{D}_{nY}$ to exceed the rate $\mathcal{D}_X$, and consequently the difunction subtractor will reduce the size of the number $n$; conversely, any tendency of the number $n$ to decrease will servo the rate $\mathcal{D}_{nY}$ to average less than the rate $\mathcal{D}_X$, and the difunction subtractor will increase the size of the number $n$. It may be shown, therefore, that the number $n$ stored in the input storage element will oscillate about, and in the ultimate tend to stabilize at a value which will cause the overflow difunction signal rate $\mathcal{D}_{nY}$ to equal the input difunction rate $\mathcal{D}_X$. Since $\mathcal{D}_{nY}$ is the difunction representation of $n\mathcal{D}_Y$, we may consequently write $$n\mathcal{D}_Y=\mathcal{D}_X \tag{13}$$

or $$n=\frac{\mathcal{D}_X}{\mathcal{D}_Y} \tag{14}$$

which signifies that the binary number stored in the input storage element represents the quotient of the mathematical operation of division upon the numbers represented by the input difunction signal trains $\mathcal{D}_X$ and $\mathcal{D}_Y$.

Consider now the concomitant operation of accumulator 42 and its response to the input difunction signal train $\mathcal{D}_Z$. It may again be shown that the output signal presented by the accumulator will be a difunction signal representative of $\mathcal{D}_{nZ}$, where $n$ is the binary number stored in input storage element 38. But as indicated by Equation 14 above, this number represents the numerical equivalent of the quotient of input difunction signal $\mathcal{D}_X$ divided by input difunction signal $\mathcal{D}_Y$. Consequently the output difunction signal presented at output terminal 24 is $$\mathcal{D}_0=\mathcal{D}_{nZ}=\frac{\mathcal{D}_X\mathcal{D}_Z}{\mathcal{D}_Y}=\mathcal{D}\frac{XZ}{Y} \tag{15}$$

or in other words, the output difunction signal is non-numerically representative of the product of the numerical equivalents of the quantities non-numerically represented by input difunction signal trains $\mathcal{D}_X$ and $\mathcal{D}_Z$, divided by the numerical equivalent of the quantity non-numerically represented by input difunction signal train $\mathcal{D}_Y$.

In the foregoing description of operation it has been assumed that the three input difunction signal trains were numerically representative of constant fractions, or in other words, that the signals in each train were cyclically repetitive in accordance with a predetermined pattern. Assume now that one or more of the quantities represented by the input difunction signal trains starts to vary as a function of time so that their difunction representations also vary with time. The effect of a change in the pattern of either the $\mathcal{D}_X$ or $\mathcal{D}_Y$ input difunction trains is to unstabilize the feedback loop formed by storage element 38, accumulator 40 and difunction subtractor 44, these elements then coacting to again drive the system to equilibrium. If one or both of the input difunction trains $\mathcal{D}_X$ or $\mathcal{D}_Y$ is continually changing with time, the equilibrium condition, as represented by the numerical quotient stored in the storage element, will also continually change with time. Consequently, the output difunction signal train presented at output terminal 24 will continually change with time in accordance with changes in the numerical quotient representative of $$\frac{\not{D}_X}{\not{D}_Y}$$

In a similar manner, changes in the input difunction signal train $\not{D}_Z$ will also be reflected directly as changes in the pattern of the output difunction signal train, in accordance with Equation 15.

In order to more completely comprehend the basic mode of operation of the difunction multiplier-dividers of the invention, consider the following example in which cyclically repetitive, $\not{D}_X$, $\not{D}_Y$ and $\not{D}_Z$ difunction input signal trains respectively representative of the values (−⅓), (+1), and (+½), are applied to a difunction multiplier-divider in which storage element 38 and accumulators 40 and 42 each have a four binary digit capacity. It is assumed that the values −⅓, +1, and +½ are constant over the time span considered in the following example, and are non-numerically represented by the difunction input signal trains $\not{D}_X$, $\not{D}_Y$, $\not{D}_Z$ respectively, in the manner hereinbefore explained. Thus for example, the difunction signal train $\not{D}_X$ is presented as a regularly recurring pattern of two −1 valued signals and one +1 valued signal, signal train $\not{D}_X$ thus representing the constant value −⅓. Signal trains $\not{D}_Y$ and $\not{D}_Z$ similarly represent the values +1 and +½ respectively. For purposes of clarity the decimal equivalents of the binary numbers stored in the accumulators and storage element during each digit time interval are tabulated. It will also be assumed that the accumulators and storage element are initially empty, or in other words, have the number zero stored therein. For convenience the output difunction signals from accumulator 40 and difunction subtractor 44 are designated $\not{D}_R$ and $\not{D}_S$, respectively; in addition, the alternate (+1)s and (−1)s presented as output signals from difunction subtractor circuit 44 when the difference between the input difunction signals is zero are circled for convenience in examining the sequential operations of the multiplier-divider. It will be remembered in this connection, that subtractor circuit 44 produces a zero representing result whenever the input signals presented to the circuit have a difference of zero, this zero result being represented by producing each two successive zero results as alternate (+1) and (−1) valued output signals.

It will be remembered referring to Table III that the signal train $\not{D}_R=\not{D}_{nY}$, and thus non-numerically represents the quantity nY. It will also be remembered that signal train $\not{D}_0$ is the signal train issuing from accumulator 42 and similarly represents the quantity $$\frac{Y}{XZ}$$

so that $$\not{D}_0=\not{D}\frac{XZ}{Y}$$

Thus in Table III, the listing at any digit time interval of a +1 valued signal of train $\not{D}_R$ indicates that the capacity of accumulator 40 was exceeded during the preceeding digit time interval (by the addition of the contents of storage element 38 into accumulator 40); while the listing of a −1 valued signal train $\not{D}_R$ indicates that the capacity of accumulator 40 was not exceeded during the previous digit time interval. It will be noted for example that the signals of train $\not{D}_R$ are continually −1 valued at each of the successive digit time intervals 1–10. However, during time interval 10, the addition of the contents

TABLE III

| Digit time intervals | $\not{D}_X$ | $\not{D}_Y$ | $\not{D}_R=\not{D}_{nY}$ | $\not{D}_S\ (\not{D}_X-\not{D}_R)$ | Storage element 38 | Accumulator 40 | $\not{D}_Z$ | Accumulator 42 | Output $\not{D}_0=\not{D}\frac{XZ}{Y}$ |
|---|---|---|---|---|---|---|---|---|---|
| | | | | | 0 | 0 | | 0 | |
| 1 | −1 | +1 | −1 | (+1) | 1 | 1 | +1 | 1 | −1 |
| 2 | −1 | +1 | −1 | (−1) | 0 | 1 | +1 | 1 | −1 |
| 3 | +1 | +1 | −1 | +1 | 1 | 2 | +1 | 2 | −1 |
| 4 | −1 | +1 | −1 | (+1) | 2 | 4 | −1 | 0 | +1 |
| 5 | −1 | +1 | −1 | (−1) | 1 | 5 | +1 | 1 | −1 |
| 6 | +1 | +1 | −1 | +1 | 2 | 7 | +1 | 3 | −1 |
| 7 | −1 | +1 | −1 | (+1) | 3 | 10 | +1 | 6 | −1 |
| 8 | −1 | +1 | −1 | (−1) | 2 | 12 | −1 | 4 | +1 |
| 9 | +1 | +1 | −1 | +1 | 3 | 15 | +1 | 7 | −1 |
| 10 | −1 | +1 | −1 | (+1) | 4 | 3 | +1 | 11 | −1 |
| 11 | −1 | +1 | +1 | −1 | 3 | 6 | +1 | 14 | −1 |
| 12 | +1 | +1 | −1 | +1 | 4 | 10 | −1 | 10 | +1 |
| 13 | −1 | +1 | −1 | (−1) | 3 | 13 | +1 | 13 | −1 |
| 14 | −1 | +1 | −1 | (+1) | 4 | 1 | +1 | 1 | +1 |
| 15 | +1 | +1 | +1 | (−1) | 3 | 4 | +1 | 4 | −1 |
| 16 | −1 | +1 | −1 | (+1) | 4 | 8 | −1 | 0 | +1 |
| 17 | −1 | +1 | −1 | (−1) | 3 | 11 | +1 | 3 | −1 |
| 18 | +1 | +1 | −1 | +1 | 4 | 15 | +1 | 7 | −1 |
| 19 | −1 | +1 | −1 | (+1) | 5 | 4 | +1 | 12 | −1 |
| 20 | −1 | +1 | +1 | −1 | 4 | 8 | −1 | 8 | +1 |
| 21 | +1 | +1 | −1 | +1 | 5 | 13 | +1 | 13 | −1 |
| 22 | −1 | +1 | −1 | (−1) | 4 | 1 | +1 | 1 | +1 |
| 23 | −1 | +1 | +1 | −1 | 3 | 4 | +1 | 4 | −1 |
| 24 | +1 | +1 | −1 | +1 | 4 | 8 | −1 | 0 | +1 |

TABLE III—Continued

| Digit time intervals | $D_X$ | $D_Y$ | $D_R=D_{nY}$ | $D_S(D_X-D_R)$ | Storage element 38 | Accumulator 40 | $D_Z$ | Accumulator 42 | Output $D_0=D\frac{XZ}{Y}$ |
|---|---|---|---|---|---|---|---|---|---|
| 25 | −1 | +1 | −1 | (+1) | 5 | 13 | +1 | 5 | −1 |
| 26 | −1 | +1 | −1 | (−1) | 4 | 1 | +1 | 9 | −1 |
| 27 | +1 | +1 | +1 | (+1) | 5 | 6 | +1 | 14 | −1 |
| 28 | −1 | +1 | −1 | (−1) | 4 | 10 | −1 | 10 | +1 |
| 29 | −1 | +1 | −1 | (+1) | 5 | 15 | +1 | 15 | −1 |
| 30 | +1 | +1 | −1 | +1 | 6 | 5 | +1 | 5 | +1 |
| 31 | −1 | +1 | +1 | −1 | 5 | 10 | +1 | 10 | −1 |
| 32 | −1 | +1 | −1 | (−1) | 4 | 14 | −1 | 6 | +1 |
| 33 | +1 | +1 | −1 | +1 | 5 | 3 | +1 | 11 | −1 |
| 34 | −1 | +1 | +1 | −1 | 4 | 7 | +1 | 15 | −1 |
| 35 | −1 | +1 | −1 | (+1) | 5 | 12 | +1 | 4 | +1 |
| 36 | +1 | +1 | −1 | +1 | 6 | 2 | −1 | 14 | −1 |
| 37 | −1 | +1 | +1 | −1 | 5 | 7 | +1 | 3 | +1 |
| 38 | −1 | +1 | −1 | (−1) | 4 | 11 | +1 | 7 | −1 |
| 39 | +1 | +1 | −1 | +1 | 5 | 0 | +1 | 12 | −1 |
| 40 | −1 | +1 | +1 | −1 | 4 | 4 | −1 | 8 | +1 |
| 41 | −1 | +1 | −1 | (+1) | 5 | 9 | +1 | 13 | −1 |
| 42 | +1 | +1 | −1 | +1 | 6 | 15 | +1 | 3 | +1 |
| 43 | −1 | +1 | −1 | (−1) | 5 | 4 | +1 | 8 | −1 |
| 44 | −1 | +1 | +1 | −1 | 4 | 8 | −1 | 4 | +1 |
| 45 | +1 | +1 | −1 | +1 | 5 | 13 | +1 | 9 | −1 |
| 46 | −1 | +1 | −1 | (+1) | 6 | 3 | +1 | 15 | −1 |
| 47 | −1 | +1 | +1 | −1 | 5 | 8 | +1 | 4 | +1 |
| 48 | +1 | +1 | −1 | +1 | 6 | 14 | −1 | 14 | −1 |
| 49 | −1 | +1 | −1 | (−1) | 5 | 3 | +1 | 3 | +1 |
| 50 | −1 | +1 | +1 | −1 | 4 | 7 | +1 | 7 | −1 |
| 51 | +1 | +1 | −1 | +1 | 5 | 12 | +1 | 12 | −1 |
| 52 | −1 | +1 | −1 | (+1) | 6 | 2 | −1 | 6 | +1 |
| 53 | −1 | +1 | +1 | −1 | 5 | 7 | +1 | 11 | −1 |
| 54 | +1 | +1 | −1 | +1 | 6 | 13 | +1 | 1 | +1 |
| 55 | −1 | +1 | −1 | (−1) | 5 | 2 | +1 | 6 | −1 |
| 56 | −1 | +1 | +1 | −1 | 4 | 6 | −1 | 2 | +1 |
| 57 | +1 | +1 | −1 | +1 | 5 | 11 | +1 | 7 | −1 |
| 58 | −1 | +1 | −1 | (+1) | 6 | 1 | +1 | 13 | −1 |
| 59 | −1 | +1 | +1 | −1 | 5 | 6 | +1 | 2 | +1 |
| 60 | +1 | +1 | −1 | +1 | 6 | 12 | −1 | 12 | −1 |
| 61 | −1 | +1 | −1 | (−1) | 5 | 1 | +1 | 1 | +1 |
| 62 | −1 | +1 | +1 | −1 | 4 | 5 | +1 | 5 | −1 |
| 63 | +1 | +1 | −1 | +1 | 5 | 10 | +1 | 10 | −1 |
| 64 | −1 | +1 | −1 | (+1) | 6 | 0 | −1 | 4 | +1 |
| 65 | −1 | +1 | +1 | −1 | 5 | 5 | +1 | 9 | −1 |
| 66 | +1 | +1 | −1 | +1 | 6 | 11 | +1 | 15 | −1 |
| 67 | −1 | +1 | −1 | (−1) | 5 | 0 | +1 | 4 | +1 |
| 68 | −1 | +1 | +1 | −1 | 4 | 4 | −1 | 0 | +1 |
| 69 | +1 | +1 | −1 | +1 | 5 | 9 | +1 | 5 | −1 |
| 70 | −1 | +1 | −1 | (+1) | 6 | 15 | +1 | 11 | −1 |
| 71 | −1 | +1 | −1 | (−1) | 5 | 4 | +1 | 0 | +1 |
| 72 | +1 | +1 | +1 | (+1) | 6 | 10 | −1 | 10 | −1 |
| 73 | −1 | +1 | −1 | (−1) | 5 | 15 | +1 | 15 | −1 |
| 74 | −1 | +1 | −1 | (+1) | 6 | 5 | +1 | 5 | +1 |
| 75 | +1 | +1 | +1 | (−1) | 5 | 10 | +1 | 10 | −1 |
| 76 | −1 | +1 | −1 | (+1) | 6 | 0 | −1 | 4 | +1 |

(+4) of storage element 38 into accumulator 40 (which contained a +15 content) caused the capacity of accumulator 40 to be exceeded leaving a +3 remainder therein and occasioning an output carry, as indicated by a +1 value of the signal of train $\not{D}_R$ during time interval 11.

The listing of a +1 or −1 valued signal of train $\not{D}_0$ at any digit time interval indicates that the capacity of accumulator 42 was respectively exceeded or not exceeded (by the selective addition or subtraction during that digit time interval of the contents of storage element 38 into accumulator 42, addition or subtraction being selectively accomplished in accordance with the +1 or −1 value of the corresponding signal of train $\not{D}_Z$). Thus it will be noted for example, that the signals of train $\not{D}_0$ are continually −1 valued until at digit time interval 4, the subtraction (by the process of complementation and addition) of the +2 contents of storage element 38 from the +2 content of accumulator 42, causes the capacity of accumulator 42 to be exceeded leaving a 0 remainder, and occasioning an output carry as indicated by the +1 valued signal of train $\not{D}_0$ at time interval 4.

It will be noted that the magnitude of the number stored in storage element 38 changes in an oscillatory but exponentially decreasing manner until, during the 63rd digit time interval, it enters into a cycle which is repeated every twelve digit time intervals thereafter. The average value of the number stored in the storage element during one cycle, as for example, from digit time interval 63 through digit time interval 74, is 5⅓. It will now be shown that 5⅓ is representative of the fraction −⅓, which in accordance with Equation 14, corresponds to $$\frac{\not{D}_X}{\not{D}_Y}$$

where $\not{D}_X = -1/3$ and $\not{D}_Y = 1$.

Since a difunction signal is capable of representing any fraction within the range from +1 to −1, it will be recognized that storage element 38 must be capable of storing binary numbers representative of all fractions within this range. It will also be recognized that the sign or polarity of the fraction must also be represented owing to the fact that the system must be capable of distinguishing between two fractions having the same absolute magnitude but different polarities.

Fortuitously, the foregoing requirement that the sign of the fraction be represented is consistent with another system requirement, namely, that in the plus one-minus one difunction system the number stored in the storage element should average out to a value equal to $$\frac{1+\frac{\not{D}_X}{\not{D}_Y}}{2}$$

so that when the number is additively transferred to the accumulators the output difunction signal train will be generated in the (+1) and (−1) difunction system. That this is so may be readily demonstrated by considering the operation of the storage element and accumulator 40 when $\not{D}_Y = +1$ and a number ($n$) representing the quantity zero is stored in storage element 38. Clearly the difunction output signal from accumulator 40 should then represent zero, and should include alternate plus ones and minus ones. However, in order to make accumulator 40 overflow every other digit time interval to generate a (+1), it will be recognized that the zero representing number stored in the storage element must equal one half the capacity of the storage element. In a binary number system, of course, half of the numerical capacity representable is readily represented by a one in the most significant digit, followed by all zeroes. Accordingly, the fractional values of the binary numbers which may be represented in a four binary digit storage element are set forth in the following table:

TABLE IV

| Decimal equivalent of binary number | Binary number stored in storage element 38 | Fraction represented |
|---|---|---|
| 0 | 0000 | −1 |
| 1 | 0001 | −⅞ |
| 2 | 0010 | −¾ |
| 3 | 0011 | −⅝ |
| 4 | 0100 | −½ |
| 5 | 0101 | −⅜ |
| 6 | 0110 | −¼ |
| 7 | 0111 | −⅛ |
| 8 | 1000 | 0 |
| 9 | 1001 | +⅛ |
| 10 | 1010 | +¼ |
| 11 | 1011 | +⅜ |
| 12 | 1100 | +½ |
| 13 | 1101 | +⅝ |
| 14 | 1110 | +¾ |
| 15 | 1111 | +⅞ |

Examination of Table IV will reveal that the sign or polarity of the fraction represented by the number stored in the storage element is given by the most significant digit of the binary number, while the last three digits of the binary number represent the magnitude of the fraction. It will also be noted that if a binal point is assumed to exist to the left of the most significant binary digit, or in Table IV the left-hand digit, each binary number is equal to $$\frac{1+\text{fraction represented}}{2}$$

as desired.

It will also be appreciated from Table IV that the maximum fraction which may be represented by a four binary digit system is +⅞. Clearly, however, the difunction multiplier dividers of the invention may utilize registers whose capacity is much larger than four binary bits, in which instance the maximum fraction which may be represented very nearly approaches +1. For example, if the capacity of storage element 38 were ten binary digits, the most significant of which represented sign, then the maximum fraction which could be represented would be $+511/512$.

From Table IV it is also apparent that certain fractions may be uniquely represented by the number stored in the storage element, while still other fractions cannot be uniquely represented. For example, the fraction +¼ is representable precisely by the binary number 1010, and in the simple difunction multiplier-divider shown in FIG. 3 wherein the number stored in the storage element oscillates about the desired value, +¼ would be represented by a cyclically repetitive pattern of 1001, 1010 and 1011, which when averaged over three digit time intervals is exactly equal to +¼.

It will be recalled, however, that in the particular example set forth in Table III hereinabove, the fraction to be stored in the storage element is −⅓, a fraction which is not uniquely representable in a four digit binary system, as illustrated in Table IV. Nevertheless, the decimal representation of the average value of the numbers stored in storage element 38 over one cycle, as from digit time interval 63 through 74 is $$\frac{5+6+5+6+5+4+5+5+6+5+6+5+6}{12} \text{ or } 5\tfrac{1}{3}$$

With reference again to Table IV, it will be recognized from interpolation of the values therein set forth that the fraction represented by the decimal number 5⅓ is −⅓. Accordingly, it should be clear that in the foregoing example illustrated in Table III the difunction multiplier-divider of the invention functions to generate in storage element 38 a composite signal which is representative of the quotient of $$\frac{\not{D}_X}{\not{D}_Y}$$

in accordance with Equation 12.

With reference once more to Table III, it may be seen that the number stored in the storage element during each digit time interval is also transferred to accumulator 42 wherein it is either added to or subtracted from the remainder stored in the associated accumulator register, the particular operation performed depending upon the value of the difunction signal simultaneously presented in input difunction signal train $\not{D}_Z$. Moreover, as the magnitude of the average number represented by the composite signals stored in the storage element increases, the value of the difunction output signal train $\not{D}_0$ from accumulator 42 becomes more positive until it finally becomes cyclically repetitive with seven $(-1)$s and five $(+1)$s during each twelve successive digit time intervals. Accordingly, the quantity non-numerically represented by the output difunction signal is $$\not{D}_0=\frac{\not{D}_X\not{D}_Z}{\not{D}_Y}=\frac{\left(-\frac{1}{3}\right)\left(\frac{1}{2}\right)}{(+1)}=\frac{5(+1)+7(-1)}{12}=\frac{1}{6}$$

It is thus seen that the output difunction is non-numerically representative of the product of the numerical equivalents of the quantities non-numerically represented by input difunction signal trains $\not{D}_X$ and $\not{D}_Z$, divided by the numerical equivalent of the quantity non-numerically represented by input difunction signal train $\not{D}_Y$. It will also be understood, of course, that once having reached an equilibrium condition, as represented by the cyclically repetitive pattern in Table III, the difunction multiplier-divider will be responsive to a change in the pattern of any one or more of the input difunction signal trains to produce a different difunction result signal at a new equilibrium condition which is arrived at in the same manner as illustrated in the foregoing example.

The example set forth in Table III also further illustrates that the operation of the difunction multiplier-dividers of the invention is substantially independent of initial conditions, or in other words, will arrive at the desired result from substantially any starting point. A related feature of the invention is that even if an electronic error should be made in the multiplier divider such that the numerical equivalent of the quotient is suddenly erroneous, the device will immediately servo back to the proper value owing to the fact that it is essentially a closed loop system independent of initial conditions.

In the foregoing illustrative example it has been assumed that switches 32 and 34 within $\not{D}_0$ generator 30 were both in their normal positions, thereby applying difunction signal trains $\not{D}_Y$ and $\not{D}_Z$ to adder-subtractor circuits 50 and 52, respectively. Assume now, however, that the armature of switch 32 is moved to engage its back contact, thereby applying the potential from battery 37 to adder-subtractor circuit 50. It will be recalled that this has the same effect as the application of a continuous train of $(+1)$ difunction signals to the adder-subtractor circuit. Consequently, adder-subtractor circuit 50 is operative solely as an adder circuit, and the composite signal which is stored in storage element 38 corresponds to the numerical equivalent of input difunction signal train $\not{D}_X$. In accordance with Table I, therefore, the output difunction signal train which appears at output terminal 24 is $\not{D}_{XZ}$ and is non-numerically representative of the product of the quantities represented by the input difunction signals $\not{D}_X$ and $\not{D}_Z$.

In a similar manner it will be recognized that if the armature of switch 34 is moved to engage its back contact while difunction signal trains $\not{D}_X$ and $\not{D}_Y$ are applied to the multiplier-divider of the invention, adder-subtractor circuit 52 is operative solely as an adder circuit in response to a simulated input difunction signal train which contains only $(+1)$s. Accordingly, in this instance accumulator 42 merely functions as a converter for transforming into a difunction output signal the quantity numerically represented by the composite signal stored in storage element 38, or in other words, is operative to generate the output difunction train $$\not{D}\frac{X}{Y}$$

in accordance with Table I.

It is apparent, of course, that if the difunction multiplier-divider of the invention is to be employed only as a multiplier, the subtractor circuitry of adder-subtractor circuit 50 will not be utilized. As shown in FIG. 4, therefore, the electronic adder-subtractor circuit in accumulator 40 may be replaced with a simple electronic adder circuit 54, thereby providing a device which is operative solely as a difunction multiplier. It will be recognized that the utilization of adder circuit 54 in effect provides a "built-in" input difunction signal $\not{D}_Y$ equal to plus one.

Figure 5:
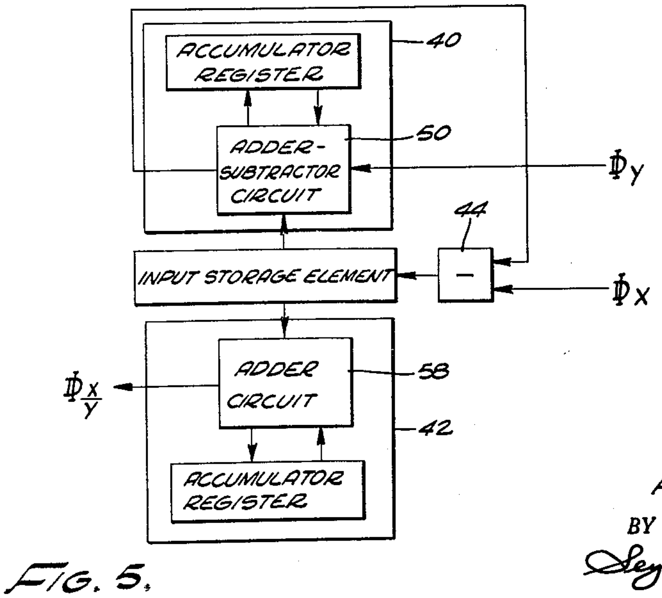

In a similar manner, FIG. 5 is a block diagram of a difunction divider which is identical with the apparatus shown in FIG. 3 with the exception that an adder circuit 58 is employed in lieu of adder-subtractor circuit 52, adder circuit 58 functioning to provide a built in $\not{D}_Z$ difunction signal train of continuous $(+1)$ signals. Inasmuch as the mode of operation of both the difunction divider shown in FIG. 5 and the difunction multiplier shown in FIG. 4 is substantially the same as that previously described for the multiplier-divider of FIG. 3, further description of their principle of operation is considered unnecessary.

It will be recalled that the difunction multiplier-dividers of the invention may be operated either as serial devices or as parallel devices, or in other words, that the composite signal stored in the storage element may be transferred to the associated accumulators sequentially, one binary digital signal at a time, or in a parallel fashion, all binary digit signals at once. With reference now to FIG. 6, there is shown a parallel difunction multiplier-divider, according to the invention, which utilizes a count-up count-down counter 60 as its storage element, a pair of parallel accumulators 62 and 64, operable under the control of difunction input signal trains $\not{D}_Y$ and $\not{D}_Z$, respectively, and a difunction subtractor circuit 44 which is responsive to the difference between difunction input signal train $\not{D}_X$ and the overflow difunction signal train from accumulator 62 for controlling the direction in which the count in counter 60 is changed. In this embodiment of the invention the previously described overflow circuit may comprise a flip-flop, for example, for storing the carry resulting from the accumulation operation on the most significant digits of the numbers being combined.

Figure 6:
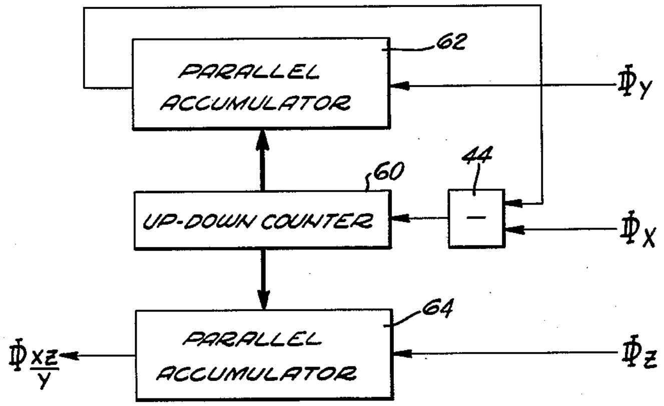
FIG. 6 is a block diagram of a parallel difunction multiplier-divider, according to the invention.

It is clear, of course, that the basic principle of operation of the difunction multiplier-divider shown in FIG. 6 is identical with that previously described for the multiplier-divider shown in FIG. 3, the only distinction being that the device of FIG. 6 is specifically limited to parallel operation in that the operations of combining the composite signals stored in the counter with the composite signals stored in the accumulators are accomplished by combining all correspondingly weighted digit signals at once. Several forms of up-down counters which may be utilized in this parallel embodiment of the invention are disclosed in U.S. Patent 2,656,106 issued October 20, 1953 to Stabler for "Shaft Position Indicator Having Reversible Counting Means," and in U.S. Patent 2,735,005 issued February 14, 1956 to the present inventor for an "Add-Subtract Counter" Similarly accumulators 62 and 64 may be of the form disclosed in chapter 13 of the afore designated book entitled "High Speed Computing Devices." It will also be recognized by those skilled in the computer art that each of the embodiments of the invention thus far described also includes a timing signal or clock pulse generator, heretofore not shown, for generating a periodically recurring electrical pulse signal once per digit time interval, for synchronizing the operation of the various elements of the difunction multiplier-dividers of the invention.

Although those skilled in the art will readily perceive how any of the many well known prior art parallel accumulators may be utilized in the parallel embodiment of the invention shown in FIG. 6, it is useful for purposes of added clarity to briefly describe the manner in which the prior art parallel accumulator shown in FIGS. 13–24 of the aforementioned book "High Speed Computing Devices" may be so utilized. This will be done with special reference to accumulator 62 shown in FIG. 6 of the present application, so as to establish the correspondence of input and output signals.

In said prior art accumulator primary synchronization and actuation of the accumulator is accomplished by an add pulse signal which is applied each compute cycle to an add pulse input and also after a short delay to an auxiliary carry pulse input. This add pulse signal will be understood to correspond in applicant's accumulator 62 to said aforementioned periodically recurring electrical pulse signal which as immediately beforementioned is applied once per digit interval to all elements of the difunction multiplier divider. The signals which are applied in the prior art device from the addend register to the accumulator, will be understood to correspond to the signals applied from the up-down counter 60 to accumulator 62. In the prior device it is contemplated that subtraction will be accomplished by applying each subtract signal as a complement pulse to reverse the states of the addend register flip-flops prior to addition. It is preferable however, to accomplish the same result by providing a suitable reversing switch in each pair of addend flip-flop output lines with all of the reversing switches being simultaneously controlled during each difunction interval by the applied signal of train $\not{D}_Y$ to thus apply each pair of addend signals reversed or nonreversed to the accumulator for the performance of subtraction or addition respectively. The final or "end around" carry signal issued in the prior art accumulator may be applied as beforementioned to applicant's overflow circuit flip-flop, which would thus function as an extra or additional stage of the accumulator. Preferably, said carry signal may be applied directly to one input of the overflow flip-flop and inverted to the other input so as to directly store either 1 or 0 carry signals therein. (The end around carry line should be broken, since end around carry feedback is not required.) Insertion of an initial 1 carry signal in subtraction may be accomplished, it is clear, by passing the carry pulse input signal (which is merely the delayed add pulse signal) through a gate controlled by the signal of train $\not{D}_Y$ and thence to the input shown as the propagated carry sum input.

Figure 7:
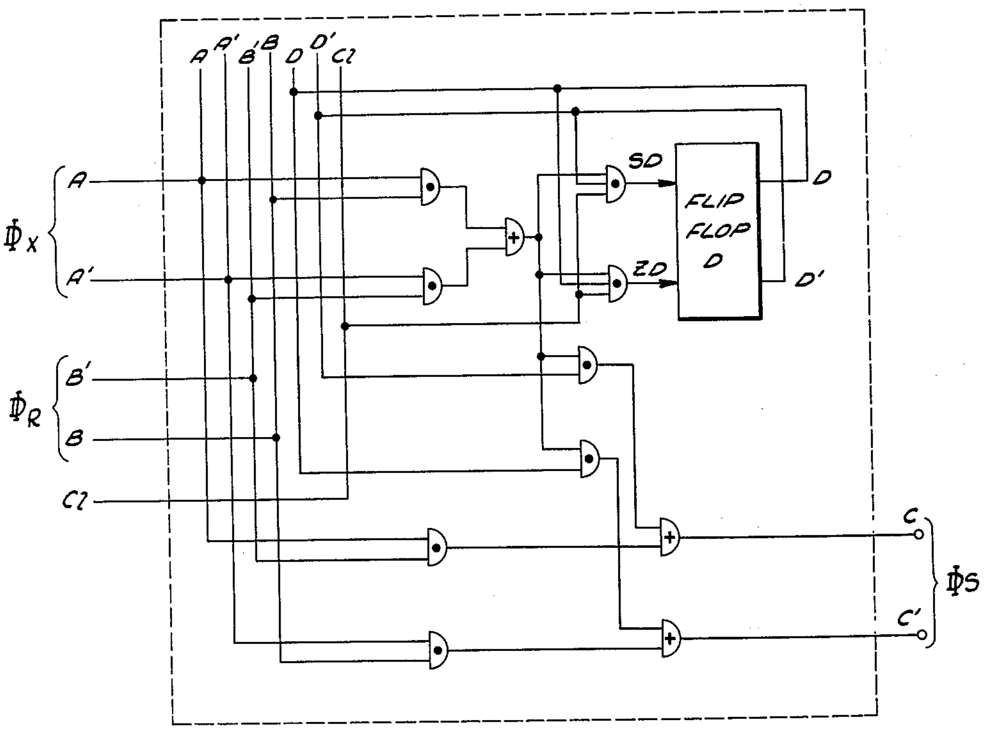
FIG. 7 is a schematic diagram of one form of difunction subtractor which may be utilized in the various embodiments of the invention.

With reference now to FIG. 7 there is shown one embodiment of a difunction subtractor circuit which may be employed in the various embodiments of the invention for generating a difunction output signal $\not{D}_S$ corresponding to the difference between first and second input difunctions $\not{D}_X$ and $\not{D}_R$, respectively. As shown in FIG. 7, the difunction subtractor circuit receives two pairs of complementary signals representing the two input difunction signal trains, and includes a bistable storage element, such as a flip-flop D, and a plurality of logical "and" and "or" gates which are utilized for controlling the conduction state of the flip-flop and for generating a pair of complementary output signals representing the output difunction signal train. For purposes of description it will be assumed that signals A, B and C correspond directly to difunction signal trains $\not{D}_X$, $\not{D}_R$ and $\not{D}_S$, and that signals A′, B′ and C′ are their inverse or complementary functions. More specifically, complementary signals A′ and B′ are useful in simplifying the logical gating networks, while complementary signal pair C and C′ provide a pair of control signals for controlling the actuation of the storage element. For example, in the embodiment of the invention shown in FIG. 6, signal C when at its high level value is representative of a plus one and is operative to actuate counter 60 to count up, whereas a high level voltage in signal C′ is representative of a minus one output signal and is operative to actuate counter 60 to count down.

Before continuing further with the description of the invention consideration will be given to the designation of the input and output conductors of the various flip-flops to be described hereinafter. Each flip-flop includes a pair of input conductors which are designated the S input conductor and Z input conductor, respectively, each conductor being further designated by an alphabetical subscript corresponding to the alphabetical designation of the flip-flop. In addition each flip-flop includes a pair of output conductors one of which is designated by the same alphabetical designation as the flip-flop from which it is taken, while the other is designated by the prime of the alphabetical designation of the flip-flop. Thus, for example, flip-flop $C_1$ in FIG. 9 has both $S_{C1}$ and $Z_{C1}$ input conductors and $C_1$ and $C_1'$ output conductors.

In operation each flip-flop will be assumed to be responsive to the application of an input signal to its S input conductor for setting to a conduction state corresponding to the binary value one or the difunction value of plus one, and to the application of an input signal to its Z input conductor for setting to the opposite conduction state, which corresponds to the binary value zero or the difunction value of minus one. In addition, it will be assumed that when the flip-flop is in its +1-representing state the voltage presented on its correspondingly designated output conductor has a relatively high level value while the voltage presented on its prime output conductor has a relatively low value. Conversely, when the flip-flop is in its −1-representing state the voltage presented on its correspondingly designated output conductor has a relatively low level value whereas the voltage presented on its prime output conductor has a relatively high level value. For example, when flip-flop $C_1$ is in its +1-representing state high and low level signals are presented on output conductors $C_1$ and $C_1'$, respectively, whereas these voltage levels will reverse when flip-flop $C_1$ is in its −1-representing state.

Each "and" and "or" gate is represented in the drawings by a semi-circular hood, each "and" gate having a dot (.) in the center thereof, while each logical "or" gate includes a plus sign (+) in its center. The "and" and "or" gates may utilize either vacuum tubes or crystal rectifiers, and are preferably similar structurally to the gating circuit illustrated in the article entitled "How an Electronic Brain Works" by Berkeley and Jensen, found on page 45 of the September 1951 issue of Radio-Electronics magazine. Briefly stated, each "and" gate includes two or more input terminals and a single output terminal and is responsive to the voltage levels of two-level signals applied to its input terminals for producing a high level voltage outputput signal at its output terminal only when all of the input signals are at their high level values. Each "or" gate, on the other hand, includes two or more input terminals and a single output terminal and is responsive to the voltage levels of two-level signals applied to its input terminals for producing a high-level output signal at its output terminal whenever one or more of the input signals is at its high level value.

It will be recalled from Table II set forth hereinabove that the difunction output sgnal $\not{D}_S$ is actually equal to $$\frac{\not{D}_X-\not{D}_R}{2}$$

owing to the fact that the actual difference between the difunction signals is either +2, 0, or −2 whereas only a +1 or −1 may be represented by the output difunction signal. It will also be recalled that successive zeroes resulting from the subtraction operation are represented by alternate (+1)s and (−1)s; as will be more clearly understood from the description of operation set forth hereinbelow, flip-flop D functions as a one bit memory for indicating whether the last zero was represented as a plus one or a minus one, or in other words, to insure that successive zeroes are represented by an alternate plus one and minus one.

The mechanization of the logical gating network employed in the difunction subtractor may be expressed by the following Boolean algebraic equations $$S_D=(A.B+A'.B').D'.cl \quad (16)$$
$$Z_D=(A.B+A'.B').D.cl \quad (17)$$
$$C=[A.B'+(A.B+A'.B').D'] \quad (18)$$
$$C'=[A'.B+(A.B+A'.B').D] \quad (19)$$

wherein the signal ($cl$) represents the periodically recurring clock pulse or timing signal received from a clock pulse source, not shown.

Consider now the significance of Equations 16 through 19 and the manner in which their mechanization satisfies the conditions tabulated in Table II. Equation 16 signifies set flip-flop D to its one-representing state whenever a clock pulse ($cl$) is received "and" the flip-flop is in its zero-representing state (D') "and" both input difunction signals are either both plus ones ($A.B$) "or" both minus ones ($A'.B'$). Conversely, Equation 17 signifies set flip-flop D to its zero representing state whenever a clock pulse ($cl$) is received "and" the flip-flop is in its one-representing state (D) "and" both input difunction signals are either both plus ones ($A.B$) "or" both minus ones ($A'.B'$). In other words, Equations 16 and 17, when taken together, signify that the conduction state of flip-flop D is reversed each time the two input difunction signal trains are the same during a particular digit time interval.

Equation 18, on the other hand, signifies that an output difunction signal of plus one should be generated whenever the minuend difunction signal $\not{D}_X$ is a plus one and the subtrahend difunction signal is a minus one ($A.B'$), "or" whenever there is a zero difference between the input difunction signals ($A.B+A'.B'$) "and" the last zero difference was represented as a minus one (D'). In an analogous manner, Equation 19 signifies that an output difunction signal of minus one should be generated whenever the minuend difunction signal $\not{D}_X$ is a minus one and the subtrahend difunction signal is a plus one ($A'.B$), "or" whenever there is a zero difference between the input difunction signals ($A.B+A'.B'$) "and" the last zero difference between the input difunctions was represented as a plus one (D).

It is apparent, therefore, that the difunction subtractor functions to produce a plus one difunction output signal when the difference between the input difunction signals is $(+1)-(-1)=+2$, a minus one difunction output signal when the difference between the input difunction signals is $(-1)-(+1)=-2$, and alternate plus ones and minus ones during successive intervals when the difference between the input difunction signals is zero. Accordingly it will be recognized that the particular difunction subtractor circuit shown in FIG. 7 produces an output difunction signal train which corresponds to one half the actual difference between the input difunction signal trains. However, since the polarity of the fraction represented by the difunction output signal train always corresponds to the polarity of the actual difference between the difunction input trains, and furthermore, since the polarity of the fraction represented by the output signal from the difunction subtractor is sufficient to servo the storage element in the proper direction, it is clear that for the purpose of the present invention it may be stated that the difunction output signal from the difunction subtractor represents the difference between the applied input difunction signals.

It should also be pointed out that although the circuit of FIG. 7 is termed a difunction subtractor circuit, it is structurally identical with a difunction adder circuit, the only distinction between the use of the circuit as a subtractor or as an adder being in the points at which signals B and B' are applied. More specifically, if the points to which signals B and B' are applied were to be reversed, the circuit of FIG. 7 would be operative to add together the input difunction signal trains $\not{D}_X$ and $\not{D}_R$. Inasmuch as the complementary signals B and B' which constitute the overflow difunction signal $\not{D}_R$ from an accumulator are clearly taken from predetermined points within the accumulator, it is obvious that a reversal of the B and B' signal conductors both in the accumulator and in the circuit of FIG. 7 would enable the difunction multiplier-dividers of the invention to operate with a difunction adder circuit in lieu of a difunction subtractor circuit. Accordingly, it is to be expressly understood that the use of the term "difunction subtractor circuit," both in the specification and in the appended claims, is intended to encompass all such equivalent structures and especially those where a change in terminology merely implies a double reversal of a pair of conductors without any change whatsoever in the basic mode of operation.

In the description of the invention set forth hereinbefore it has been assumed that the difunction output signal train produced by the difunction subtractor circuit is utilized directly for controlling the actuation of the storage element, or in other words, that the storage element operates as an accumulator responsive to the output signal from the difunction subtractor circuit for producing a composite electrical signal representative of the numerical equivalent of the quotient of the quantities represented by two of the input difunction signal trains. Although difunction multiplier-dividers constructed in accordance with the basic principles thus far set forth will perform satisfactorily in many control applications, there are some system applications in which difunction multiplier-dividers having faster response characteristics are desired, or in other words, in which the time constant of the response curve is preferably smaller. It will be noted from the example tabulated in Table III, for instance, that the pattern of the composite signals stored in the storage element does not start to cycle until the 63rd digit time interval. It should be pointed out, however, that although the response illustrated by Table II may be slower than desired, it is actually fairly rapid since it represents the response of the system to a step function which covers an appreciable part of the system range.

It will also be recalled from the description of operation taken with regard to Table III that the resultant quotient stored in numerical form in the storage element actually oscillates about the correct value, even when the quotient is precisely representable by a binary number. If system requirements are such that either of the above characteristics of the simple difunction multiplier-divider are undesirable, a decision element may be employed, in accordance with the invention, to overcome the undesirable characteristic.

Figure 8:
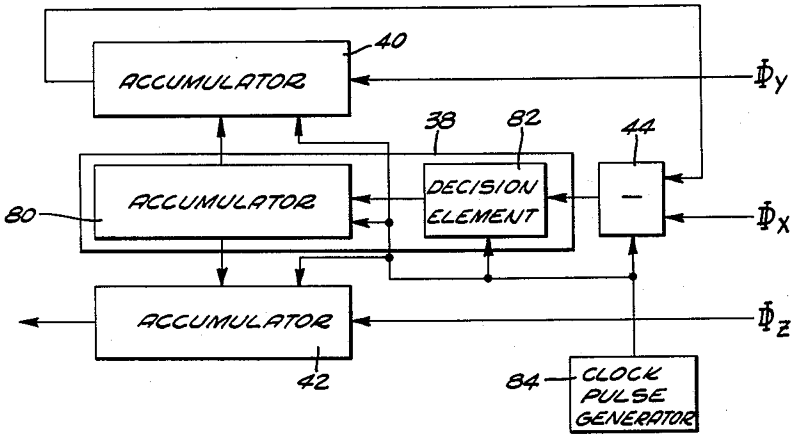
FIG. 8 is a block diagram of difunction multiplier-divider which includes a decision element to modify the response of the device to the applied difunction signal trains.

With reference now to FIG. 8, there is shown a difunction multiplier-divider, according to the invention, wherein storage element 38 includes an accumulator 80 and a decision element 82 intercoupling accumulator 80 with the output circuit of difunction subtractor 44, decision element 82 being operable under the control of the difunction output signal from the subtractor circuit for actuating its associated accumulator at a rate different from the rate represented by the difunction output signal train from the subtractor circuit. In addition, the difunction multiplier-divider of FIG. 8 also includes a clock pulse source 84 which is connected to accumulators 40, 42, and 80, and to the decision element and difunction subtractor circuit for synchronizing their operation. As indicated previously, the clock pulse source is operative to generate a periodically recurring pulse signal, one signal occurring during each digit time interval; it will also be recognized by those skilled in digital techniques that the sources, not shown, of input difunction signal trains $Đ_X$, $Đ_Y$ and $Đ_Z$ are also preferably actuated in synchronism with the same clock pulse source, thereby assuring that one difunction signal is presented in each of the difunction signal trains during each digit time interval.

The precise form of the decision element employed in a particular difunction multiplier-divider, as stated previously, is determined to a large extent by system requirements. In order to illustrate more specifically the function of decision elements and the manner in which they modify the operation of a simple multiplier-divider, several embodiments of decision elements will now be described.

Figure 9:
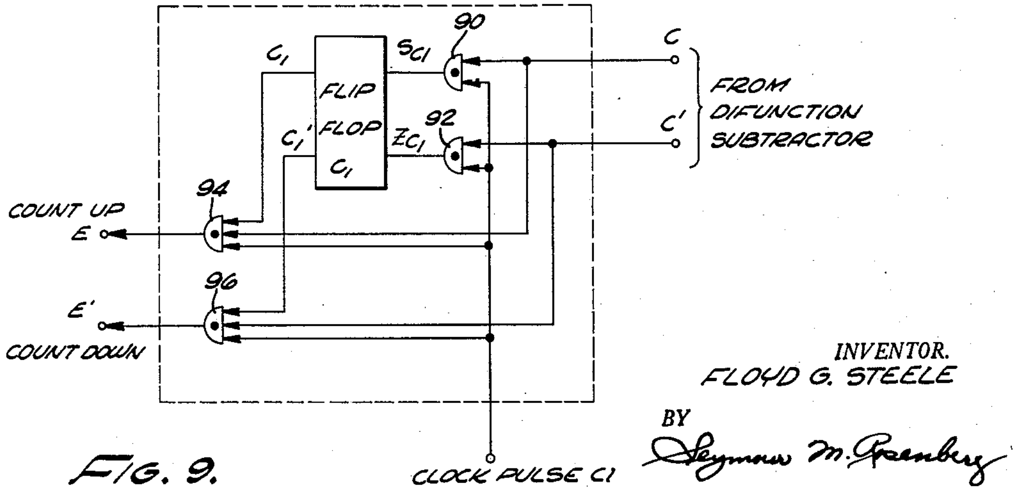
FIGS. 9 and 10 are schematic diagrams of several different forms of decision elements which may be employed in the difunction multiplier-dividers of the invention.

With reference to FIG. 9 there is shown one form of decision element which may be employed to curtail the tendency of the numerical quotient stored in the storage element to oscillate about the desired value. As illustrated in FIG. 9 the decision element produces a pair of output control signals E and E' for respectively directing its associated accumulator to either count up or count down, and includes a flip-flop $C_1$ into which is shifted each of the sequential difunction signals generated by the difunction subtractor circuit, the setting of the flip-flop being performed by a pair of input "and" gates 90 and 92. In addition the decision element includes a pair of output "and" gates 94 and 96, respectively, these gates being mechanized in accordance with the following logical equations to generate control signals E and E':

$$E=C.C_1.cl \tag{20}$$

$$E'=C'.C_1'.cl \tag{21}$$

In operation the decision element of FIG. 9 is operative to produce an output signal E for increasing the value of the number represented by the composite signal stored in the associated accumulator only when two sequential difunction signals from the difunction subtractor circuit have a value of plus one, as indicated by Equation 20. Conversely, a count down output signal $E_1$ is produced only when two sequential difunction signals from the difunction subtractor circuit have a value of minus one. Accordingly, whenever two sequential output signals from the difunction subtractor have opposite values, no output signal is produced by the decision element, thereby leaving unchanged the number represented by the composite signal stored in the associated accumulator.

Recall now the basic mode of operation of the difunction multiplier-dividers of the invention as previously described with regard to FIG. 3. It will be remembered that as the value of the number represented by the composite signal stored in the storage element approaches the proper quotient, the difference function generated by the difunction subtractor includes more and more zeroes, these zeroes being represented by alternate plus ones and minus ones. Consequently the decision element of FIG. 9 will be operative to produce fewer and fewer output control signals until, when the system has reached equilibrium, the output signal from the difunction subtractor circuit will alternate between plus one and minus one substantially continuously and the composite signal stored in the storage element will remain substantially unchanged. In fact, if it is assumed that the input difunction signals represent substantially constant values, and are therefore cyclically repetitive, and if it is further assumed that the quotient is precisely representable by a binary number whose least significant digit is within the capacity of the storage element, it may be demonstrated that a complete equilibrium will be reached at which no output control signals are generated by the decision element.

Although the particular decision element shown in FIG. 9 functions extremely well to smooth or damp the transient response of a difunction multiplier-divider in which it is utilized, it is nevertheless limited by the fact that it increases slightly the system time constant. If speed of response is a critical parameter, however, still other decision elements may be employed to provide the rapid response desired.

Figure 10:
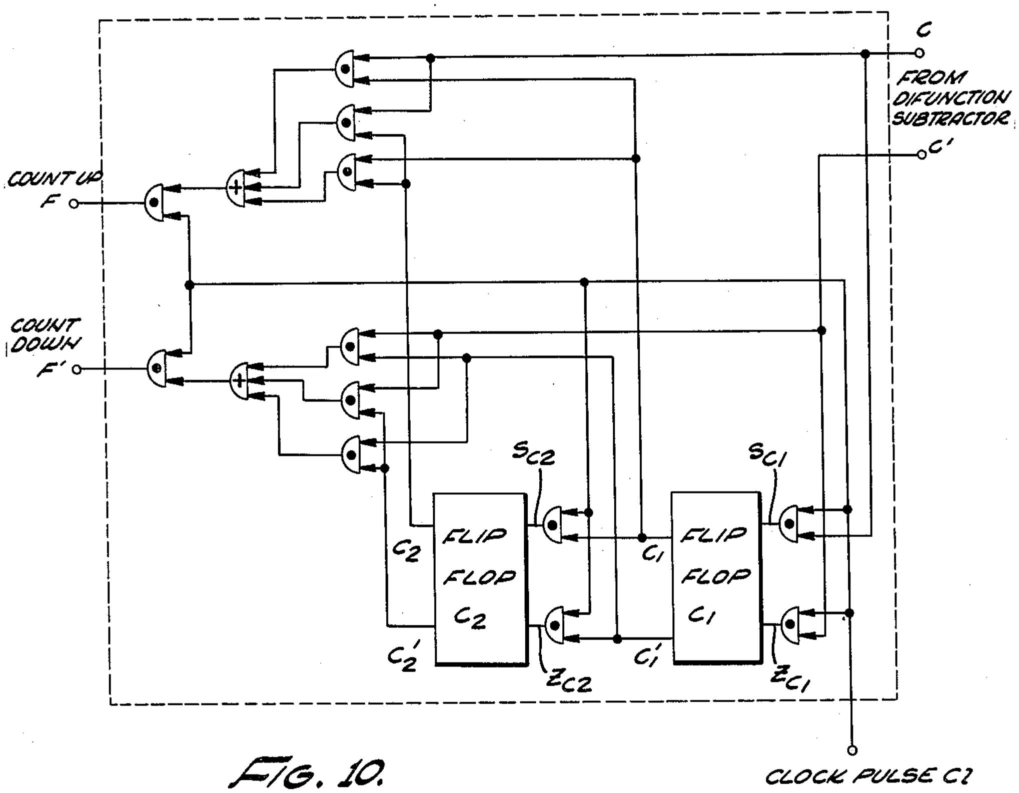

With reference now to FIG. 10 there is shown a decision element which is operative to change the magnitude of the quotient stored in the storage element on a best two out of three basis, or more particularly, to increase the magnitude of the quotient when two or more of the last three difunction signals received from the difunction subtractor circuit represent plus ones, and to decrease the magnitude of the quotient when two or more of the last three difunction signals received represent minus ones. As shown in FIG. 10, the decision element includes two flip-flops $C_1$ and $C_2$ which are interconnected as a shifting register for receiving the sequential difunction output signals from the difunction subtractor circuit, and includes a plurality of logical gating circuits for generating a pair of complementary output control signals F and F' respectively operative to actuate the associated quotient storage element to count up or count down. These gates are mechanized in accordance with the following equations:

$$F=[C.C_1+C.C_2+C_1.C_2].cl \tag{22}$$

$$F'=[C'.C_1'+C'.C_2'+C_1'.C_2'].cl \tag{23}$$

where the term (*cl*) again represents the applied clock pulse signal. It will be recognized from Equations 22 and 23 that the storage element receives a count up signal (F) whenever any two of the last three difunction signals presented represent plus ones, while the storage element receives a count down signal (F') whenever any two of the last three difunction signals received represent minus ones.

In order to more fully comprehend the functioning of the decision element of FIG. 10 and the manner in which it may be employed to increase the speed of response of the difunction multiplier-dividers of the invention, consider now the following example in which the difunction input signal trains are identical to those utilized in the example tabulated in Table III. It will be assumed that during the first digit time interval the difunction signals stored in flip-flops $C_1$ and $C_2$ represent a minus one signal and a plus one signal, respectively.

TABLE V

| Digit time interval | $Đ_X$ | $Đ_Y$ | $Đ_R$ | $Đ_S$ | Storage element 38 | Accumulator 40 | $Đ_Z$ | Accumulator 42 | $Đ_0$ |
|---|---|---|---|---|---|---|---|---|---|
| 1 | −1 | +1 | −1 | (+1) | 1 | 1 | +1 | 1 | −1 |
| 2 | −1 | +1 | −1 | (−1) | 0 | 1 | +1 | 1 | −1 |
| 3 | +1 | +1 | −1 | +1 | 1 | 2 | +1 | 2 | −1 |
| 4 | −1 | +1 | −1 | (+1) | 2 | 4 | −1 | 2 | +1 |
| 5 | −1 | +1 | −1 | (−1) | 3 | 7 | +1 | 5 | −1 |
| 6 | +1 | +1 | −1 | +1 | 4 | 11 | +1 | 12 | −1 |
| 7 | −1 | +1 | −1 | (+1) | 5 | 0 | +1 | 1 | +1 |
| 8 | −1 | +1 | +1 | −1 | 6 | 6 | −1 | 11 | −1 |
| 9 | +1 | +1 | −1 | +1 | 7 | 13 | +1 | 2 | +1 |
| 10 | −1 | +1 | −1 | (−1) | 6 | 3 | +1 | 8 | −1 |
| 11 | −1 | +1 | +1 | −1 | 5 | 8 | +1 | 13 | −1 |
| 12 | +1 | +1 | −1 | +1 | 4 | 12 | −1 | 9 | +1 |
| 13 | −1 | +1 | −1 | (+1) | 5 | 1 | +1 | 14 | −1 |
| 14 | −1 | +1 | +1 | −1 | 6 | 7 | +1 | 4 | +1 |
| 15 | +1 | +1 | −1 | +1 | 7 | 14 | +1 | 11 | −1 |
| 16 | −1 | +1 | −1 | (−1) | 6 | 4 | −1 | 5 | +1 |
| 17 | −1 | +1 | +1 | −1 | 5 | 9 | +1 | 10 | −1 |
| 18 | +1 | +1 | −1 | +1 | 4 | 13 | +1 | 14 | −1 |
| 19 | −1 | +1 | −1 | (+1) | 5 | 2 | +1 | 3 | +1 |
| 20 | −1 | +1 | +1 | −1 | 6 | 8 | −1 | 13 | −1 |
| 21 | +1 | +1 | −1 | +1 | 7 | 15 | +1 | 4 | +1 |
| 22 | −1 | +1 | −1 | (−1) | 6 | 5 | +1 | 10 | −1 |

TABLE V—Continued

| Digit time interval | $\not D_X$ | $\not D_Y$ | $\not D_R$ | $\not D_S$ | Storage element 38 | Accumulator 40 | $\not D_Z$ | Accumulator 42 | $\not D_0$ |
|---|---|---|---|---|---|---|---|---|---|
| 23 | −1 | +1 | +1 | −1 | 5 | 10 | +1 | 15 | −1 |
| 24 | +1 | +1 | −1 | +1 | 4 | 14 | −1 | 11 | +1 |
| 25 | −1 | +1 | −1 | ⊕1 | 5 | 3 | +1 | 0 | +1 |
| 26 | −1 | +1 | +1 | −1 | 6 | 9 | +1 | 6 | −1 |
| 27 | +1 | +1 | −1 | +1 | 7 | 0 | +1 | 13 | −1 |
| 28 | −1 | +1 | +1 | −1 | 6 | 6 | −1 | 7 | +1 |
| 29 | −1 | +1 | −1 | ⊖1 | 5 | 11 | +1 | 12 | −1 |
| 30 | +1 | +1 | −1 | +1 | 4 | 15 | +1 | 0 | +1 |
| 31 | −1 | +1 | −1 | ⊕1 | 5 | 4 | +1 | 5 | −1 |
| 32 | −1 | +1 | +1 | −1 | 6 | 10 | −1 | 15 | −1 |
| 33 | +1 | +1 | −1 | +1 | 7 | 1 | +1 | 6 | +1 |
| 34 | −1 | +1 | +1 | −1 | 6 | 7 | +1 | 12 | −1 |
| 35 | −1 | +1 | −1 | ⊖1 | 5 | 12 | +1 | 1 | +1 |
| 36 | +1 | +1 | −1 | +1 | 4 | 0 | −1 | 13 | −1 |
| 37 | −1 | +1 | +1 | −1 | 3 | 3 | +1 | 0 | +1 |
| 38 | −1 | +1 | −1 | ⊕1 | 4 | 7 | +1 | 4 | −1 |
| 39 | +1 | +1 | −1 | +1 | 5 | 12 | +1 | 9 | −1 |
| 40 | −1 | +1 | −1 | ⊖1 | 6 | 2 | −1 | 3 | +1 |
| 41 | −1 | +1 | +1 | −1 | 5 | 7 | +1 | 8 | −1 |
| 42 | +1 | +1 | −1 | +1 | 4 | 11 | +1 | 12 | −1 |
| 43 | −1 | +1 | −1 | ⊕1 | 5 | 0 | +1 | 1 | +1 |

Examination of Table V will reveal that the numerical equivalent of the quotient, as represented by the composite signals stored in the storage element, starts to cycle during the seventh digit time interval, and recycles every thirty-six digit time intervals thereafter, it being assumed that the values of the input difunction signal trains remain constant. It will also be perceived that the output difunction signal $\not D_0$ recycles continuously after the seventh digit time interval, the value represented by the output difunction signal train over one cycle being $$\frac{15(+1)+21(-1)}{36}=-\frac{1}{6}$$

as desired.

Although only two specific decision elements have been shown and described, it is clear that still other types of decision elements may be employed in the difunction multiplier-dividers of the invention. For example, a "bang-bang" type of decision element may be utilized to provide the digital equivalent of the familiar "bang-bang" control known in analogue servo systems. One simple structure which will provide this type of operation is a decision element embodying the decision element shown in FIG. 9 together with an additional flip-flop, the output control signals E and E′ from the circuit of FIG. 9 being applied to the input terminals of the added flip-flop to control its state of operation. The output signals from the added flip-flop may then be employed to control the application of the clock pulse signal to the associated quotient storage element to actuate the element to either increase or decrease the magnitude of the number represented by the signals stored therein.

If this type of decision element is utilized the quotient storage element is actuated to count up at a maximum rate, as for example once per digit time interval, every time two sequential plus one difunction signals are received from the difunction subtractor circuit, the operation continuing until two sequential minus one difunction signals are received from the difunction subtractor circuit. Upon the receipt of two sequential minus one signals the operation is reversed and the quotient storage element is actuated to count down at a maximum rate until two sequential plus one signals are received. It will be recognized that this type of decision element is even faster in response that the decision element shown in FIG. 10, and in essence provides a digital bang-bang servo.

Figure 11:
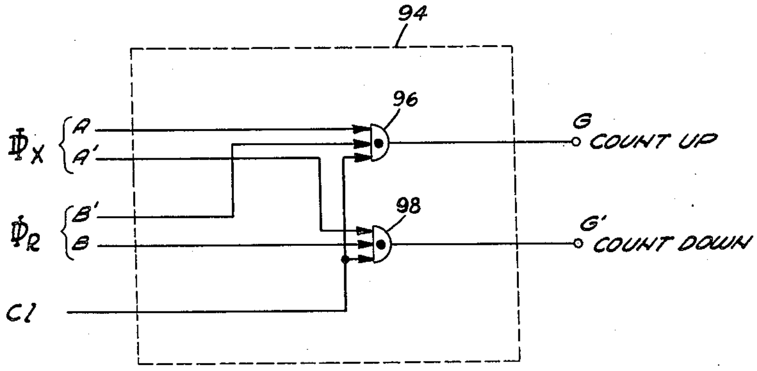
FIG. 11 is a schematic diagram of another difunction subtractor circuit which in essence is a combined difunction subtractor and decision element.

It should also be pointed out that a combined difunction subtractor and decision element may be employed in the difunction multiplier-dividers of the invention. With reference now to FIG. 11 there is shown a combined difunction subtractor and decision element 94 which produces a pair of control signals G and G′ and which merely includes a pair of and gates 96 and 98 mechanized in accordance with the following equations $$G=A.B'.cl \qquad (24)$$

$$G'=A'.B.cl \qquad (25)$$

In operation the circuit of FIG. 11 functions to actuate the storage element to count up only when the input difunction signal $\not D_X$ represents a plus one and the overflow difunction $\not D_R$ represents a minus one. Conversely, the storage element is actuated to count down only when the input difunction $\not D_X$ represents a minus one and when the overflow difunction represents a plus one. It will be recognized that the primary difference between the circuit of FIG. 11 and the difunction subtractor of FIG. 7 is that no output signal is generated during those intervals when the applied difunction signals are equal, or in other words, when their difference for a particular difunction interval is zero. From a functional standpoint, therefore, the circuit of FIG. 11 is still properly termed a difunction subtractor. Among the advantages which may be obtained from the utilization of the circuit of FIG. 11 are smoothing of the transient response of the system, and a simplified structure which does not require any bistable storage elements.

It will be recalled that the various embodiments of the invention may utilize either a plurality of bistable elements, such as flip-flops, for storing the composite signals in the accumulators and storage element, or may utilize other types of storage media, such as magnetizable tracks on a drum, as a common memory unit. The utilization of a magnetic drum is especially applicable to serially operable difunction multiplier-dividers, although it is clear, of course, that a magnetic drum memory could also be employed in a parallel device. In order to more clearly illustrate the manner in which a magnetic drum may be utilized in a difunction multiplier-divider, according to the invention, consideration will be given next to a typical serially operable multiplier divider.

With reference now to FIG. 12 there is shown a serial embodiment of a difunction multiplier divider, according to the invention, which again includes a pair of accumulators 40 and 42 for receiving input difunction signal trains $\not D_Y$ and $\not D_Z$, and which also includes a third accumulator 100 for producing a composite signal corresponding to the accumulation of the differences between the individual difunction signals in input signal train $\not D_X$ and the overflow difunction signal train from accumulator 40. It will be recognized from this statement of the function of accumulator 100 that the accumulator is in reality the equivalent of storage element 38 and difunction subtractor 44, as shown in FIG. 3, for example.

Each of accumulators 40, 42 and 100 includes a shifting register and a serially operable adder-subtractor circuit, the shifting registers being designated 102, 104 and 106, respectively, while the adder-subtractor circuits are respectively designated 108, 110 and 112. Adder-subtractor circuits 108 and 110 are both two input devices, one input signal to each of adder-subtractor circuits 108 and 110 being received from the output circuit of adder-subtractor 112 while the other input signal is received from the output circuit of its associated shifting register.

In operation adder-subtractor circuits 108 and 110 are selectively operable under the control of input difunction signal trains $\not{D}_Y$ and $\not{D}_Z$ to serially add or subtract the correspondingly weighted binary digits represented by the composite signals stored in their associated shifting register and in accumulator 100. In addition, adder-subtractor circuits 108 and 110 also include a first output circuit for applying to its associated register a signal train representing the result of the arithmetic operation performed, and a second output circuit for applying to an associated gated flip-flop the carry signal resulting from the performance of an arithmetic operation on the most significant or highest order binary digits of the numbers represented by the applied composite signals. These flip-flops are designated 114 and 116 in FIG. 12, while their associated gates are designated 118 and 120. It will be understood, as herebefore mentioned and as explained in more detail below, that flip-flop 114 and its associated gate 118 comprise a suitable overflow circuit for cooperation with serial adder-subtractor 108. Since such a serial adder-subtractor may produce a sequence of carry outputs during each compute cycle (one carry signal being produced for each binary order), gate 118 is provided as a selection gate which is opened only at the appropriate time (corresponding to the combining of the highest order binary digits of the composite numbers) so as to permit only the highest order digit carry to be stored in flip-flop 114.

As illustrated in FIG. 12 the output signal from flip-flop 116 represents the output difunction signal train $\not{D}_0$ while the overflow difunction signal train from flip-flop 114 is fed back to a difunction subtractor circuit 122 within accumulator 100 wherein it is subtracted from input difunction signal train $\not{D}_X$. The output difunction signal train from difunction subtractor 122 is then employed to control the arithmetic operation performed by serial adder subtractor circuit 112 within accumulator 100.

It should be noted that adder-subtractor circuit 112 is essentially a one input adder-subtractor and receives its input signal from its associated shifting register 106. Inasmuch as the function of this adder-subtractor circuit is to merely add one or subtract one from the binary number represented by the composite signal stored in accumulator 100, and since the operations of add and subtract are selectively controlled by the output signal from the difunction subtractor, it will be recognized by those skilled in the art that in those prior art adder-subtractors which directly subtract subtrahend signal (rather than complementing and adding such signals), to perform the desired function it is merely necessary to set the carry flip-flop within adder subtractor circuit 112 to one upon receipt from register 106 of the digit signal representing the least significant digits of the binary number stored in the accumulator. The operation of adding or subtracting 1 with a complementing type of adder-subtractor is somewhat more complex and will be described in detail herebelow.

As shown in FIG. 12, the serially operable embodiment of the invention also includes a timing pulse generator 124 which generates two different but related clock pulse signals on a pair of timing pulse busses 126 and 128. The recurring signals which appear on bus 126 will hereinafter be termed computer pulses, one signal occurring during each difunction timing interval, or in other words, once per digit time interval as this term has been utilized hereinbefore. The signals which appear on bus 128, on the other hand, will be termed shift signals and occur at a rate which is an integral multiple of the compute pulse rate, the ratio of these rates being determined by the number of binary digits representable by the composite signals produced in the accumulators. For example, if the composite signals stored in the accumulators represent 10 digit binary numbers, the ratio of shift signals to compute signals is ten to one. It may also be shown that under the same assumption, each of shifting registers 102, 104 and 106 has a ten digit capacity, or stated differently, should provide a ten digit time delay.

Consider now the function and utilization of the shift and compute pulses in synchronizing the operation of the various elements of the serially operable difunction multiplier-divider. Shift pulse bus 128 is connected to each of shifting registers 102, 104 and 106 for sequentially shifting therethrough the digit signals of the composite signals, stored therein, the order of appearance of the digit signals at the output circuits of the registers being from the least significant binary digit to the most significant digit. In addition, bus 128 is also connected to adder-subtractor circuits 108 and 110 for synchronizing those operations of the adder-subtractor which occur repetitively within each difunction interval, as for example to synchronously set each successive carry signal formed into the carry flip-flop or delay element which is included within the adder-subtractor and to adder subtractor circuit 112 for similarly synchronizing its operations upon the binary digit signals of the quotient stored in accumulator 100.

In a similar manner, compute bus 126 is connected to the associated input instruments for synchronizing the appearance of the input difunction signals with the operation of the multiplier divider, and is also applied to difunction subtractor circuit 122 and to serial adder subtractor circuit 112. It will be recalled from the description of FIG. 7 that the function of the timing signal in the difunction subtractor circuit is to actuate flip-flop D to store signals representative of zero differences between the applied input difunctions. The function of the compute signal in adder-subtractor circuit 112, on the other hand, is (in a direct subtracting embodiment of circuit 112) to set the carry flip-flop to one after the most significant digit signal of the quotient has been operated upon but before the recirculated least significant digit of the quotient is operated upon. In a complementing type of prior art adder-subtractor circuit, such as is shown in the aforementioned Stibitz patent, the initial carry must be inserted as a 0 if addition is to be performed and inserted as a 1 if subtraction is to be performed, and therefore in such an embodiment the compute signal is used to synchronize the insertion of such initial 0 or 1 carry signals, as is explained in more detail herebelow.

As shown in FIG. 12, timing bus 126 is also connected to gate circuits 118 and 120 and to adder subtractor circuits 108 and 110 within accumulators 40 and 42, respectively, the compute signal being applied to the gate circuits for pulsing these gates at the proper selection time (corresponding to the combining of the most significant binary digits of the composite numbers) so as to set flip-flops 114 and 116 to conduction states corresponding to the carry signals generated by the associated adder-subtractor circuits as a result of an arithmetic operation performed on the most significant digit signals of the applied composite signals. The application of the compute timing signal to adder subtractor circuits 108 and 110, on the other hand, is employed to insert an initial 0 or 1 within these circuits after the most significant digit signals of the applied composite signals have been operated upon but before the recirculated least significant digit signals are operated upon, thereby assuring that an erroneous carry signal is not included in the subsequent serial operation of addition or substraction.

Although the manner in which well known prior art serial adder-subtractors may be utilized and adapted in the practice of the invention will be immediately apparent to those skilled in the art, for purpose of greater clarity two specific prior art adder-subtractors will be briefly described and for, purposes of example, the input and output lines of these prior art adder-subtractors will be correlated with the comparable input and output lines of applicant's adder subtractor 108 shown in FIG. 12.

Considering the adder-subtractor shown in the aforementioned Stibitz reference, U.S. Patent 2,609,143, it is seen that the principal element of adder-subtractor there disclosed comprises a digit adder 82 (shown in detail in FIG. 12 of Stibitz). The complete adder-subtractor, however, has provisions for carry delay and feedback, complementation of subtrahend signals in subtraction, and insertion of initial or lowest order 0 or 1 carry signals in addition or subtraction respectively, and will therefore be understood to comprise (as shown in FIG. 1 of Stibitz) the interconnected elements 81, 82, 171, 130, 141–143, 148, 149, 215 and 216. Elements 81 and 216 are reversing switches which as specifically set forth may be of an electronic type operating under the control of a signal indicating whether addition or subtraction is to be performed, element 81 complementing or not complementing the signals applied thereto for subtraction or addition, and element 211 controlling corresponding insertion of an initial 1 or 0 carry. The control signals for elements 81 and 82 of Stibitz, are therefore comparable to the signals of train $\not{D}_Y$ of the present application. The addend input signals B, B′ of Stibitz are comparable in the present application to the input signals applied to adder-subtractor 108 from register 102. The addend-subtrahend input signals to element 81 of Stibitz are comparable in the present application to the input signals applied to adder subtractor 108 from unit 112; while the sum output signals of Stibitz are comparable to the sum output signals applied in the present application from 108 to register 102. Applicant's high frequency shift signals applied along line 128 are comparable to the high-frequency shift signals which in the Stibitz reference are applied to the single delay carry flip-flop comprising elements 141–144 to synchronize the entering of each successive carry signal into the flip-flop. Applicant's low frequency timing or compute signals applied along line 126, are comparable to the Stibitz low frequency timing signals which are applied to switch 215 of Stibitz to control the insertion of single initial 1 or 0 carry signals at the beginning of each cycle of computation. The carry signals which in the present application are applied to gate 118 of applicant's overflow circuit, are comparable to the Stibitz carry output signals issuing from the Stibitz element 171.

Similar correspondences of input and output signals will, of course, apply for serial adder-subtractor 110 shown in FIG. 12 of the present application.

In adapting such a complementing type prior art adder-subtractor for use in applicant's two input adder-subtractor 112, the only significant change required is to internally apply, by suitable means, fixed or continuous 0 representing input signals to the addend-subtrahend input (as to element 81 of Stibitz). Indication as to whether addition or subtraction is to be performed is supplied by the output signal from difunction subtractor 122, and the normal operation of the adder subtractor in complementing or not complementing the fixed 0 input and inserting an initial 1 or 0 carry, thereby effects the required subtraction or addition of one from the quotient register.

Still another prior art serial adder subtractor which may be readily utilized in the practice of the present invention is shown at FIG. 16 in Australian Patent 162,263, accepted March 30, 1955, and assigned to Northrup Aircraft. Said prior art adder-subtractor is adapted for adding or subtracting applied Y number signals from applied R number signals in accordance with the sign of an applied *dx* signal, and produces for each combining an overflow *dz* signal representing the carry resulting from the most significant digits. As shown in FIG. 16 of the Northrup reference, this prior art adder subtractor will be seen to comprise the interconnected elements 230, 232–234, 236, 237, D2, 239 and 243. The correspondence of inputs and outputs is so direct as to require little comment. Thus for example control for addition or subtraction corresponds to the $dx^+$, $dx^-$ signals shown in the Northrup reference, the addend-subtrahend input is comparable to the common input to elements 234 and 230 of Northrup. Applicant's high frequency timing signal is comparable to the Northrup high frequency timing signal C used to synchronize most gates and applicant's low frequency compute signal is comparable to the Northrup signal P24 which synchronizes insertion of lowest order digit carrys via element 239. Applicant's overflow circuit could be appropriately connected to the carry output lead connecting the Northrup elements 233 and 237 (or alternatively may be connected to the sum line 146).

It will be remembered that the serially operable difunction multiplier-divider shown in FIG. 12 is particularly adaptable for use with a magnetic drum storage element. More particularly, it will be apparent to those skilled in the digital computer art that each of shifting registers 102, 104 and 106 may comprise a magnetizable track on a memory drum, together with associated writing and reading transducers. In operation the writing transducers then function to convert to sequential magnetized cells on their respective magnetic tracks the sequential result digit signals received from the associated serial adder-subtractor circuits, while the reading transducers function to reconvert the magnetized cells, after a predetermined time delay, back into sequential result digit signals which are in turn reapplied to the respectively associated serial adder subtractor circuits.

Before concluding the description of the invention it should be mentioned that several factors should be considered in the utilization of the difunction multiplier-dividers herein disclosed. Firstly, in the application of the invention to any particular control problem care should be exercised to assure that the absolute magnitude of the fraction represented by the difunction input signal train $\not{D}_Y$ is larger than the absolute magnitude of the fraction represented by the input difunction signal train $\not{D}_X$. The obvious purpose of this limitation is to prevent the numerical quotient representative of $$\not{D}\frac{X}{Y}$$

from exceeding the capacity of the quotient storage element, and thereby prevent instability. In practice it is only necessary to properly scale the input quantities to insure that this condition is met.

The second factor which should be considered in the utilization of the multiplier-dividers herein disclosed is also related to the same problem, namely, that the numerical quotient should not exceed the capacity of the quotient storage element. It will be recalled that the input difunction signal train $\not{D}_Y$ is capable of representing either a negative fraction or a positive fraction within the range from minus one to plus one. Owing, however, to the fact that the quotient should never exceed the capacity of its storage element, it is clear that the moving average of difunction signal train $\not{D}_Y$ should not change polarity during operation since this would imply a representation of zero at the point of polarity reversal and would result in the generation of a numerical quotient whose value would be unbounded. Obviously, however, if the first condition restricting the absolute magnitude of difunction train $\not{D}_Y$ with respect to difunction train $\not{D}_X$ is fulfilled, the second condition with respect to polarity reversals will automatically be fulfilled.

In conclusion it is to be expressly understood that the basic concept of the invention herein disclosed is not to be limited to the specific embodiments shown or to the form of the specific difunction signal trains illustrated. For example, although the operation of the difunction multiplier-dividers of the invention has been described with particular reference to the plus one—minus one difunction system, it is clear that the invention may also be utilized for multiplying and/or dividing input difunction signals whose levels are representative of other algebraic quantities. Accordingly, the invention is to be limited only by the spirit and scope of the appended claims.

What is claimed as new is:

1. A difunction computing element for performing one of the mathematical operations of multiplication and division upon first and second numerical quantites non-numerically represented by first and second difunction signal trains of bivalued electrical signals, each signal of a signal train having either a first value representing a first algebraic number or a second value representing a second algebraic number, the numerical quantity represented by each signal train being equal to the algebraic average of the numbers represented by the signals in the train, said computing element comprising: first means for receiving said first and second difunction signal trains, said first means being responsive to said difunction signal trains for generating electrical signals numerically representative of the result of the mathematical operations; and second means coupled to said first means and responsive to said generated electrical signals for producing an output difunction signal train consonant with said first and second difunction signal trains and non-numerically representing the result of the mathematical operation.

2. A difunction computing element for performing the mathematical operation of multiplication upon first and second numerical quantities non-numerically represented by first and second difunction signal trains of bivalued electrical signals, each signal of a signal train having either a first value representing a first algebraic number or a second value representing a second algebraic number, the numerical quantity represented by each signal train being equal to the algebraic average of the numbers represented by the signals in the train, said computing element comprising: first means for receiving said first and second difunction signal trains, said first means being responsive to said difunction signal trains for generating electrical signals numerically representative of the product of the numerical quantities represented by said first and second signal trains; and second means coupled to said first means and responsive to said generated electrical signals for producing an output difunction signal train consonant with said first and second difunction signal trains and non-numerically representative of the result of the multiplication performed.

3. A difunction computing element for performing the mathematical operation of division upon first and second numerical quantities non-numerically represented by first and second difunction signal trains of bivalued electrical signals, each signal of a signal train having either a first value representing a first algebraic number or a second value representing a second algebraic number, the numerical quantity represented by each signal train being equal to the algebraic average of the numbers represented by the signals in the train, said computing element comprising: first means for receiving said first and second difunction signal trains, said first means being responsive to said difunction signal trains for generating electrical signals numerically representative of the quotient of the numerical quantities represented by said first and second signal trains; and second means coupled to said first means and responsive to said generated electrical signals for producing an output difunction signal train consonant with said first and second difunction signal trains and non-numerically representative of the result of the division performed.

4. A difunction computing element for producing an output difunction signal train non-numerically representative of the numerical value of the quantity $$\frac{XZ}{Y}$$

where the quantities X, Y and Z are the numerical equivalent values of corresponding first, second and third input difunction signal trains, respectively, each difunction signal train being composed of a series of bivalued electrical signals, each signal of a signal train having either a first value representing a first algebraic number or a second value representing a second algebraic number, the numerical equivalent value of each difunction signal train being equal to the algebraic average of the numbers represented by the signals in the train, said computing element comprising: first means for receiving said first and second input difunction signal trains, said first means including a feedback loop and being responsive to said first and second difunction signal trains for generating electrical signals representative of the numerical equivalent of the quantity $$\frac{X}{Y}$$

second means coupled to said first means and responsive to said generated signals and to said third input difunction signal train for generating electrical signals representative of the numerical equivalent of the quantity $$\frac{XZ}{Y}$$

and third means coupled to said second means and responsive to the electrical signals generated by said second means for producing an output difunction signal train consonant with said first, second and third difunction signal trains and representative of the numerical equivalent of the quantity $$\frac{XZ}{Y}$$

5. The difunction computing element defined in claim 4 wherein said third means includes means selectively operable to produce either a first valued signal representing the algebraic number 1 or a second valued signal representing the algebraic number 0, the numerical equivalent of the difunction output signal train over a given interval being equal to the number of first valued signals occurring within the interval divided by the total number of first and second valued signals occurring within the interval.

6. The difunction computing element defined in claim 4 wherein said third means includes means selectively operable to produce either a first valued signal representing the algebraic number (+1) or a second valued signal representing the algebraic number (−1), the numerical equivalent of the difunction output signal train over a given interval being equal to the number of first valued signals occurring within the interval minus the number of second valued signals occurring within the interval all divided by the total number of first and second valued signals occurring within the interval.

7. The difunction computing element defined in claim 6 wherein the signals of said second input difunction signal train are all at a first value representing the number 1 whereby the numerical value of the quantity Y is one and said output difunction signal train is non-numerically representative of the numerical equivalent of the quantity XZ.

8. The difunction computing element defined in claim 6 wherein the signals of said third input difunction signal train are all at a first value representing the number 1 whereby the numerical value of the quantity Z is one and said output difunction signal train is non-numerically representative of the numerical equivalent of the quantity $$\frac{X}{Y}$$

9. A difunction computing element for producing an output difunction signal train non-numerically representative of the numerical value of the quantity $$\frac{XZ}{Y}$$

where the quantities X, Y and Z are the numerical equivalent values of corresponding first, second and third input difunction signal trains, respectively, each difunction signal train being composed of a series of periodic bivalued electrical signals, each signal of a signal train having either a first value representing a first algebraic number or a second value representing a second algebraic number, the numerical equivalent value of each difunction signal train being equal to the algebraic average of the numbers represented by the signals in the train, said computing element comprising: first means for receiving said first and second input difunction signal trains, said first means including a feedback loop and being responsive to said first and second difunction signal trains for generating electrical signals representative of the binary numerical equivalent of the quantity $$\frac{X}{Y}$$

and second means coupled to said first means and responsive to said generated signals and to said third input difunction signal train for producing an output difunction signal train consonant with said first, second and third difunction signal trains and non-numerically representative of the numerical equivalent of the quantity $$\frac{XZ}{Y}$$

10. The difunction computing element defined in claim 9 wherein said first means includes a storage unit for storing the generated electrical signals representative of the binary numerical equivalent of the quantity $$\frac{X}{Y}$$

11. The difunction computing element defined in claim 10 wherein said second means comprises: an accumulator register for storing electrical signals representative of a binary numerical quantity, said accumulator register capable of storing a predetermined number of signals; a transfer network coupled to said accumulator register and to said storage unit and responsive to each bivalued signal in said third input difunction signal train for selectively combining the signals stored in said accumulator register with the signals stored in said storage unit to produce a composite result signal, said composite result signal having a plurality of signals numerically representative of the binary digits of the sum of the numbers represented by the signals stored in said accumulator register and said storage unit when the applied bivalued signal of said third difunction signal train is at said first value, said composite result signal having a plurality of signals numerically representative of the binary digits of the difference between the numbers represented by the signals stored in said accumulator register and said storage unit when the applied bivalued signal of said third difunction signal train is at said second value; and means for replacing the signals previously stored in said accumulator with the corresponding composite result signal; and means for producing an output difunction signal having second value when the number of signals in said composite result signal is less than said predetermined number, and having said first value when the number of signals in said composite result signal exceeds said predetermined number.

12. A difunction computing element for producing an output difunction signal train non-numerically representative of the numerical value of the quantity $$\frac{XZ}{Y}$$

where the quantities X, Y and Z are the numerical equivalent values of corresponding first, second and third input difunction signal trains, respectively, each difunction signal train being composed of a series of bivalued electrical signals, each signal of a signal train having either a first value representing the algebraic number (+1) or a second value representing the algebraic number (−1), the numerical equivalent value of each difunction signal train being equal to the algebraic average of the numbers represented by the signals in the train, said computing element comprising: an electronic up-down counting unit, said counting unit being actuable in response to an applied difunction signal for producing a first composite electrical signal representative of a binary number corresponding to the number of (+1) signals received minus the number of (−1) signals received; a first electronic accumulator for storing a composite electrical signal having $n$ signals representative of the binary digits of an $n$-digit binary number, said accumulator including a first transfer network coupled to said counting unit, said first transfer network being responsive to each (+1) or (−1) valued signal in said second input difunction signal train for combining the composite signal stored in said counter unit with the composite signal stored in said first accumulator to store in said first accumulator a first new composite signal representative of the least significant $n$ binary digits of the sum or difference, respectively, of the numbers represented by the combined composite signals, said first transfer network being operative to produce an output signal representative of the $(n+1)$ digit of said sum or difference; said output signal having said first and second values when said $(n+1)$ digit equals 1 and 0, respectively, whereby the sequential output signals from said first transfer network represent an overflow difunction signal train; a difunction subtractor for receiving the first difunction input signal train and said overflow signal train and being responsive thereto for producing an output difunction signal train non-numerically representative of the difference between the numbers represented by said first difunction input signal train and said overflow signal train; means for intercoupling said counter unit with said difunction subtractor for actuating said counter unit in accordance with said output difunction signal train from said difunction subtractor whereby the number represented by the composite signal stored in said counter unit tends to stabilize at the numerical value of the quantity $$\frac{X}{Y}$$

and a second electronic accumulator for storing a composite electrical signal having $m$ signals representative of the binary digits of an $m$-digit binary number, said second accumulator including a second transfer network coupled to said counting unit, said second transfer network being responsive to each (+1) or (−1) valued signal in said third input difunction signal train for combining the composite signal stored in said counter unit with the composite signal stored in said second accumulator to store in said second accumulator a second new composite signal representative of the least significant $m$ digits of the sum or difference, respectively, of the numbers represented by the combined composite signals, said second transfer network being operative to produce an output signal representative of the $(m+1)$ digit of said sum or difference, said output signal having said first and second values when said $(m+1)$ digit equals 1 and 0, respectively, whereby the sequential output signals from said second transfer network are an output difunction signal train non-numerically representative of the numerical value of the quantity $$\frac{XZ}{Y}$$

13. The difunction computing element defined in claim 12 wherein $n$ is equal to $m$.

14. The difunction computing element defined in claim 13 wherein said first and second transfer networks includes first and second electronic adder-subtractor circuits, respectively, said first and second adder-subtractor circuits being selectively operable in response to the sequential values of said second and third input difunction signal trains, respectively.

15. A difunction computing element for producing an output difunction signal train non-numerically representative of the numerical value of the quantity $$\frac{XZ}{Y}$$

where the quantities X, Y and Z are the numerical equivalent values of corresponding first, second and third input difunction signal trains, respectively, each difunction signal train being composed of a series of periodic bivalued electrical signals, each signal of a signal train having either a first value representing the algebraic number (+1) or a second value representing the algebraic number (−1), the numerical equivalent value of each difunction signal train being equal to the algebraic average of the numbers represented by the signals in the train, said computing element comprising: an electronic up-down counting unit, said counting unit being actuatable in response to an applied difunction signal for producing a first composite electrical signal representative of a binary number corresponding to the number of (+1) signals received minus the number of (−1) signals received; first and second electronic accumulator registers for storing composite electrical signals representative of binary numbers, each of said registers having a predetermined capacity; a common transfer network coupled to said counting unit and to said registers, said transfer network being responsive to each (+1) or (−1) valued signal in said second input difunction signal train for combining the composite signals stored in said counter unit with the composite signal stored in said first register to produce a first new composite signal representative of the sum or difference, respectively, of the numbers represented by the composite signals stored in said counter unit and said first register, said transfer network being normally operative to produce an output signal having said second value and to store said first new composite signal in said first register when the number represented by said first new composite signal is less than or equal to the capacity of said first register, said transfer network being operative to produce an output signal having said first value and to store in said first register a composite signal representing all but the most significant digit of the number represented by the first new composite signal when the number represented by the first new composite signal exceeds the capacity of said first register, whereby the sequential output signals from said transfer network represent an overflow difunction signal train; a difunction subtractor for receiving the first difunction input signal train and said overflow signal train and being responsive thereto for producing an output difunction signal train non-numerically representative of the difference between the numbers represented by said first difunction input signal train and said overflow signal train; and means for intercoupling said counter unit with said difunction subtractor for actuating said counter unit in accordance with said output difunction signal train from said difunction subtractor whereby the number represented by the composite signal stored in said counter unit tends to stabilize at the numerical value of the quantity $$\frac{X}{Y}$$

said common transfer network being responsive to each (+1) or (−1) valued signal in said third input difunction signal train for combining the composite signals stored in said counter unit with the composite signal stored in said second accumulator register to produce a second new composite signal representative of the sum or difference, respectively, of the numbers represented by the composite signals stored in said counter unit and said second register, said transfer network being normally operative to produce a second output signal having said second value and to store said second new composite signal in said second register when the number represented thereby is less than or equal to the capacity of said second register, said transfer network being operative to produce a second output signal having said first value and to store in said second register a composite signal representing all but the most significant digit of the number represented by the second new composite signal when the number represented by said second new composite signal exceeds the capacity of said second register, whereby the sequential second output signals from said transfer network are an output difunction signal train non-numerically representative of the numerical value of the quantity $$\frac{XZ}{Y}$$

16. The difunction computing element defined in claim 15 wherein said common transfer network includes a time shared electronic adder-subtractor circuit coupled to said counting unit and alternately coupleable to said first and second registers, first means for alternately coupling said adder-subtractor circuit to said first and second registers, and second means operable in synchronism with said first means for alternately applying said second and third input difunction signal trains, respectively, to said adder-subtractor circuit, the period of one cycle of said first and second means being substantially equal to the period of one bilevel signal in each of said input difunction signal trains.

17. A difunction computing element for producing an output difunction signal train non-numerically representative of the numerical value of the quantity XZ where the quantities X and Z are the numerical equivalent values of corresponding first and second input difunction signal trains, respectively, each difunction signal train being composed of a series of periodic bivalued electrical signals, each signal of a signal train having either a first value representing the algebraic number (+1) or a second value representing the algebraic number (−1), the numerical equivalent value of each difunction signal train being equal to the algebraic average of the numbers represented by the signals in the train, said computing element comprising: an electronic up-down counting unit, said counting unit being actuatable in response to an applied difunction signal for producing a first composite electrical signal representative of a binary number corresponding to the number of (+1) signals received minus the number of (−1) signals received; a first electronic accumulator for storing a composite electrical signal representative of a binary number, said accumulator having a predetermined capacity and including an electronic adder circuit coupled to said counting unit, said adder circuit being operable to combine the composite signals stored in said counter unit with the composite signal stored in said first accumulator to produce a first new composite signal representative of the sum of the numbers represented by the composite signals stored in said counter unit and said first accumulator, said adder circuit being normally operative to produce an output signal having said second value and to store said first new composite signal in said first accumulator when the number represented by said first new composite signal is less than or equal to the capacity of said accumulator, said adder circuit being operative to produce an output signal having said first value and to store in said accumulator a composite signal representing all but the most significant digit of the number represented by the first new composite signal when the number represented by the first new composite signal exceeds the capacity of said first accumulator, whereby the sequential output signals from said adder circuit are an overflow difunction signal train; a difunction subtractor for receiving the first difunction input signal train and said overflow signal train and being responsive thereto for producing an output difunction signal train non-numerically representative of the difference between the numbers represented by said first difunction input signal train and said overflow signal train; means for intercoupling said counter unit with said difunction subtractor for actuating said counter unit in accordance with said output difunction signal train from said difunction subtractor whereby the number represented by the composite signal stored in said counter unit tends to stabilize at the numerical value of the quantity X; and a second electronic accumulator for storing a composite electrical signal representative of a binary number, said second accumulator having a predetermined capacity and including an electronic adder-subtractor circuit coupled to said counting unit, said adder-subtractor circuit being responsive to each (+1) or (−1) valued signal in said second input difunction signal train for combining the composite signals stored in said counter unit with the composite signal stored in said second accumulator to produce a second new composite signal representative of the sum or difference, respectively, of the numbers represented by the composite signals stored in said counter unit and said second accumulator, said adder-subtractor circuit being normally operative to produce an output signal having said second value and to store said second new composite signal in said second accumulator when the number represented thereby is less than or equal to the capacity of said second accumulator, said adder-subtractor circuit being operative to produce an output signal having said first value and to store in said second accumulator a composite signal representing all but the most significant digit of the number represented by the second new composite signal when the number represented by said second new composite signal exceeds the capacity of said second accumulator, whereby the sequential output signals from said adder-subtractor circuit are an output difunction signal train non-numerically representative of the numerical value of the quantity XZ.

18. A difunction computing element for producing an output difunction signal train non-numerically representative of the numerical value of the quantity $$\frac{X}{Y}$$

where the quantities X and Y are the numerical equivalent values of corresponding first and second input difunction signal trains, respectively, each difunction signal train being composed of a series of periodic bivalued electrical signals, each signal of a signal train having either a first value representing the algebraic number (+1) or a second value representing the algebraic number (−1), the numerical equivalent value of each difunction signal train being equal to the algebraic average of the numbers represented by the signals in the train, said computing element comprising: an electronic up-down counting unit, said counting unit being actuatable in response to an applied difunction signal for producing a first composite electrical signal representative of a binary number corresponding to the number of (+1) signals received minus the number of (−1) signals received; a first electronic accumulator for storing a composite electrical signal representative of a binary number, said accumulator having a predetermined capacity, and including an adder-subtractor circuit coupled to said counting unit, said adder-subtractor circuit being responsive to each (+1) or (−1) valued signal in said second input difunction signal train for combining the composite signals stored in said counter unit with the composite signal stored in said first accumulator to produce a first new composite signal representative of the sum or difference, respectively, of the numbers represented by the composite signals stored in said counter unit and said first accumulator, said adder-subtractor circuit being normally operative to produce an output signal having said second value and to store said first new composite signal in said first accumulator when the number represented by said first new composite signal is less than or equal to the capacity of said accumulator, said adder-subtractor circuit being operative to produce an output signal having said first value and to store in said accumulator a composite signal representing all but the most significant digit of the number represented by the first new composite signal when the number represented by the first new composite signal exceeds the capacity of said first accumulator, whereby the sequential output signals from said adder-subtractor circuit are an overflow difunction signal train; a difunction subtractor for receiving the first difunction input signal train and said overflow signal train and being responsive thereto for producing an output difunction signal train non-numerically representative of the numerical difference between the numbers non-numerically represented by said first difunction input signal train and said overflow signal train; means for intercoupling said counter unit with said difunction subtractor for actuating said counter unit in accordance with said output difunction signal train from said difunction subtractor whereby the number represented by the composite signal stored in said counter unit tends to stabilize at the numerical value of the quantity $$\frac{X}{Y}$$

and a second electronic accumulator for storing a composite electrical signal representative of a binary number, said second accumulator having a predetermined capacity and including a transfer network coupled to said counting unit, said transfer network being operable to combine the composite signals stored in said counter unit with the composite signal stored in said second accumulator to produce a second new composite signal representative of the sum of the numbers represented by the composite signals stored in said counter unit and said second accumulator, said transfer network being normally operable to produce an output signal having said second valve and to store said second new composite signal in said second accumulator when the number represented thereby is less than or equal to the capacity of said second accumulator, said transfer network being operative to produce an output signal having said first value and to store in said second accumulator a composite signal representing all but the most significant digit of the number represented by the second new composite signal when the number represented by said second new composite signal exceeds the capacity of said second accumulator, whereby the sequential output signals from said transfer network are an output difunction signal train non-numerically representative of the numerical value of the quantity $$\frac{X}{Y}$$

19. A difunction computing element for producing an output difunction signal train non-numerically representative of the numerical value of the quantity $$\frac{XZ}{Y}$$

where the quantities X, Y and Z are the numerical equivalent values of corresponding first, second and third input difunction signal trains, respectively, each difunction signal train being composed of a series of periodic bivalued electrical signals, each signal of a signal train having either a first value representing the algebraic number (+1) or a second value representing the algebraic number (−1), the numerical equivalent value of each difunction signal train being equal to the algebraic average of the numbers represented by the signals in the train, said computing element comprising: an electronic up-down counting unit, said counting unit being actuatable in response to an applied difunction signal for producing a first composite electrical signal representative of a binary number corresponding to the number of (+1) signals received minus the number of (−1) signals received; first and second electronic registers for storing composite electrical signals representative of binary numbers, each of said registers having a predetermined capac ty; a transfer network coupled to said counting unit and to said registers, said transfer network being responsive to each (+1) or (−1) valued signal in said second input difunction signal train for combining the composite signals stored :n said counter unit with the composite signal stored in said first register to produce a first new composite signal representative of the sum or difference, respectively, of the numbers represented by the composite signals stored in said counter unit and said first register; first means for storing sa d first new composite signal in said first register and for producing an output signal having said first value when the number represented by the first new composite signal exceeds the capacity of said first register, whereby the output signal from said first means represents an overflow difunction signal train; a difunction subtractor for receiving the first difunction input signal train and said overflow signal train and being responsive thereto for producing an output difunction signal train non-numerically representative of the numerical difference between the numbers non-numerically represented by said first difunction input signal train and said overflow signal train; means for intercoupling said counter unit with said difunction subtractor for actuating said counter unit in accordance with said output difunction signal train from said difunction subtractor whereby the number represented by the composite signal stored in said counter unit tends to stabilize at the numerical value of the quantity $$\frac{X}{Y}$$

said transfer network being responsive to each (+1) or (−1) valued signal in said third input difunct on signal train for combining the composite signals stored in said counter unit with the composite signal stored in said second register to produce a second new composite signal representative of the sum or difference, respectively, of the numbers represented by the composite signals stored in said counter unit and said second register; and second means for storing said second new composite signal in said second register and for producing an output signal having said first value when the number represented by said second new composite signal exceeds the capacity of said second register, whereby the output signal from said second means represents an output difunction signal train non-numericaly representative of the numerical value of the quantity $$\frac{XZ}{Y}$$

20. In a difunction computing element for producing an output d:function signal train representative of the numerical result of one of the mathematical operations of multiplication and division of first and second quantities represented as first and second input difunction signal trains, respectively, each of said difunction signal trains including a plurality of signals having either a first value representing a first algebraic number or a second value representing a second algebraic number, the combination comprising: first cyclically operable storage means including first and second input terminals for receiving difunction signal trains; means for applying the first input difunction signal train to sa d first input terminal, said first storage means being operable during each cycle for producing a composite output signal representative of the summation of the differences between the signals of the first input difunction signal train and the correspond ng signals applied to said second input terminal during the preceding cycles; second and third cyclically operable storage means each coupled to said first cyclically operable storage means for receiving said composite output signal, each of said second and third storage means having an input terminal and being operable during successive cycles for producing an output d function signal train consonant with said first difunction signal train and representative of the summation of the products of the signals applied to its associated input terminal and the corresponding summation signals stored in said first storage means; a feedback loop for applying the difunction output signal from one of said second and third storage means to said second input terminal of said first storage means; and means for applying the second difunction signal train to the input terminal of one of sa d second and third cyclically operable storage means.

21. The combination defined in claim 20 which further includes means for operating said first, second and third cyclically operable storage means in synchronism.

22. The combination defined in claim 21 wherein said feedback loop includes means for applying the output d function signal train from said second storage means to said second input terminal of said first storage means, and wherein the second input difunction signal train is applied to said input terminal of said second storage means.

23. The combination defined in claim 21 where n said feedback loop includes means for applying the output difunction signal train from said second storage means to said second input terminal of said first storage means, and wherein the second input difunction signal tra n is applied to said input terminal of said third storage means.

References Cited in the file of this patent

UNITED STATES PATENTS

| | | |
|---|---|---|
| 2,701,095 | Stibitz | Feb. 1, 1955 |
| 2,840,306 | Steele | June 24, 1958 |

FOREIGN PATENTS

| | | |
|---|---|---|
| 1,055,460 | France | Oct. 14, 1953 |
| 1,094,570 | France | Dec. 8, 1954 |
| 1,095,026 | France | Dec. 15, 1954 |

OTHER REFERENCES

Trans of IRF Professional Group on Electronic Computers, EC3 #1, March 1954—An Operational Digital Feedback Divider, by Meyer et al., pages 17–20.